(12) United States Patent
Dannenhauer et al.

(10) Patent No.: US 7,246,554 B2
(45) Date of Patent: Jul. 24, 2007

(54) BAKING OVEN CHARGING ARRANGEMENT AND BAKING SYSTEM COMPRISING SUCH CHARGING ARRANGEMENT AND BAKING OVEN

(75) Inventors: Bernd Dannenhauer, Dinkelsbühl (DE); Frank Blümel, Mönchsroth (DE); Thomas Schmidt, Martinsheim (DE)

(73) Assignee: Werner & Pfleiderer Lebensmitteltechnik GmbH, Dinkelsbuhl (DE)

( * ) Notice: Subject to any disclaimer, the term of this patent is extended or adjusted under 35 U.S.C. 154(b) by 450 days.

(21) Appl. No.: 10/864,888

(22) Filed: Jun. 10, 2004

(65) Prior Publication Data

US 2005/0022803 A1  Feb. 3, 2005

(30) Foreign Application Priority Data

Jun. 10, 2003  (DE) ............... 103 26 481
Aug. 6, 2003  (DE) ............... 103 36 457
Dec. 15, 2003  (DE) ............... 103 58 541

(51) Int. Cl.
*A47J 37/00* (2006.01)
*B65G 59/00* (2006.01)

(52) U.S. Cl. ............ 99/355; 99/443 C; 221/113; 221/120; 221/121

(58) Field of Classification Search ............ 99/352, 99/353, 355, 386, 387, 407, 443 C, 467; 221/113, 120, 121, 188
See application file for complete search history.

(56) References Cited

U.S. PATENT DOCUMENTS

| 3,111,913 | A | * | 11/1963 | Mladek et al. ............ 99/353 |
| 3,735,692 | A | * | 5/1973 | Marchignoni ............ 99/353 |
| 5,360,134 | A | * | 11/1994 | Falk et al. ............ 221/2 |
| 5,396,833 | A | * | 3/1995 | Atwood et al. ............ 99/353 |
| 6,352,173 | B1 | * | 3/2002 | Duckworth ............ 221/82 |
| 6,592,923 | B2 | * | 7/2003 | Chandler et al. ............ 426/512 |
| 6,820,539 | B2 | * | 11/2004 | Haas et al. ............ 99/353 |
| 6,915,734 | B2 | * | 7/2005 | Torghele et al. ............ 99/348 |

FOREIGN PATENT DOCUMENTS

DE  101 16 423 C2  10/2002
DE  203 02 346 U1  5/2003

\* cited by examiner

*Primary Examiner*—Reginald L. Alexander
(74) *Attorney, Agent, or Firm*—Browdy and Neimark, PLLC

(57) ABSTRACT

A charging arrangement for a baking oven (8) is provided with a supply arrangement (9) for dough pieces (4) and a lifting and delivery device (34) for the dough pieces (4). The supply arrangement (9) is provided with a charging inlet, at least one supply bin (10, 23) and a supply outlet arranged underneath the charging inlet. A delivery inlet portion (37) of the lifting and delivery device (34) that is located at the bottom is in delivery engagement with the outlet of the supply arrangement under the influence of gravity. A baking system (1) with such a charging arrangement (9) can be easily operated and does not require the continuous presence of an operator. Furthermore, it can have an optically attractive design.

16 Claims, 30 Drawing Sheets

BAKING OVEN CHARGING ARRANGEMENT AND BAKING SYSTEM COMPRISING SUCH CHARGING ARRANGEMENT AND BAKING OVEN

BACKGROUND OF THE INVENTION

1. Field of the Invention

The invention relates to a baking oven charging arrangement and a baking system comprising such charging arrangement and a baking oven.

2. Background Art

Baker's shops need baking systems which can be operated as easily and conveniently as possible, offering accessibility of the baking operation even to customers. The baking systems presently used in bakeries are still in need of improvement in at least one of the above aspects. For example, charging a bakery oven is often complicated, requiring an operator to be permanently available. Moreover, familiar baking systems are not always optically attractive.

SUMMARY OF THE INVENTION

It is an object of the present invention to develop a baking system, and in particular a charging arrangement therefor, in such way that on the one hand a baking oven of the system can be operated efficiently and that there is a possibility of having an aesthetically attractive baking system on the other hand.

According to the invention, this object is attained in a baking oven charging arrangement
  with at least one supply arrangement for dough pieces comprising
    a supply inlet for charging,
    at least one supply bin,
    a supply outlet arranged below the supply inlet for charging in the area of the bottom of the supply arrangement,
  with a lifting and delivery device for dough pieces comprising
    a delivery inlet portion arranged below which is in delivery engagement with the supply outlet of the supply arrangement in such a manner that the dough pieces are conveyed from the supply outlet to the delivery inlet portion at least to some extent under the influence of gravity,
    a driven lifting and delivery device between the delivery inlet portion and a delivery outlet portion.

The idea of the invention resides in that charging a baking oven can be simplified by the charging arrangement being provided with a lifting and delivering device. This ensures moderate charging height, overhead charging no longer being necessary. Moreover, the supply arrangement ensures prolonged operation of a baking system with a charging arrangement of the species, there being no need of an operator being permanently available. Frequently, delivery elements for conveyance under gravity are constructionally less complicated than delivery elements that abandon the effect of gravity upon delivery. Delivery under gravity need not exclusively rely on gravity, this meaning that the effect of gravity can also be used for support of the conveying function of the delivery element.

A plurality of supply bins which are in delivery engagement with each other in such a way that the dough pieces are conveyed under the influence of gravity to a supply bin which is arranged below constitute a high capacity supply arrangement, there being no need of too high a filling level within a supply bin. Any damages to dough pieces by the load of dough pieces placed on top will thus be precluded.

A supply and delivery arrangement for the conveyance of the dough pieces to the supply outlet and for the separation of the dough pieces ensures defined delivery of the dough pieces from the supply arrangement to the lifting and delivering device.

A supply bin according having a cylindrical shape and being sub-divided into a plurality of supply sectors offers the possibility of defined filling and emptying.

Parting walls which separate the supply sectors from each and which are rotatably driven around a central longitudinal axis of the supply bin help implement easy conveyance of the dough pieces within the supply bin.

Provision of at least one supply bin being replaceably attached facilitates charging of the supply arrangement. Dough pieces need not be charged from one bin to another; the entire supply bin can be exchanged instead.

A feed screw with flights being located from each other at a distance which corresponds to a typical expansion of a dough piece ensures defined delivery of the dough pieces, which works in favor of separation. It is conceivable to use other conveying means as a lifting and delivering unit by alternative to a feed screw. An example for conveying means of the generic type may be a circulating conveyor belt, the conveying surface of which is inclined so that the dough pieces overcome a difference of level between the delivery inlet portion and the delivery outlet portion. In this case, the conveying surface may for example be a brush surface. The conveying surface may in particular be inclined by 90° towards a horizontal line i.e., it may be vertical. In such a case, provision must be made for the dough pieces to rest safely on the conveying surface during delivery. This can be implemented by a rigid baffle plate which is in contact with the conveyed dough pieces on the side opposite the conveying surface. Instead of the baffle plate, provision may be made for a second conveyor belt, the conveying surface of which and that of the lifting and delivery device being synchronous so that the dough pieces are conveyed vertically between the two conveying surfaces. Prior to lifting delivery, separation of the dough pieces is possible for example by a centrifuge.

The charging arrangement may have a positioning arrangement for a set of dough pieces comprising
  a feed portion which is in delivery engagement with the delivery outlet portion of the lifting and delivery arrangement in such a manner that the dough pieces are conveyed under the influence of gravity from the delivery outlet portion to the feed portion,
  a positioning arrangement which determines individual positions of dough pieces of a set of dough pieces,
  an outlet portion which is in delivery engagement with a charging inlet of the baking oven in such a manner that the dough pieces are conveyed from the outlet portion to a receptacle of the baking oven for the set of dough pieces located underneath the charging inlet under the influence of gravity and retaining the relative individual positions of the dough pieces of the set of dough pieces. This ensures automatic and defined charging of receptacles of the baking oven.

Producing a positioning frame being formed as a positioning frame with a plurality of positioning receptacles for each one of the dough pieces is not very complicated constructionally. Moreover, it ensures reliable separation of the dough pieces in the corresponding receptacles of the baking oven.

The positioning arrangement may be driven by a driving motor in such a manner that it can be switched between a positioning setting where the dough pieces of a set of dough pieces from the feed portion are separated into individual positions and a transfer setting where the positioning arrangement is in delivery engagement with a charging inlet of the baking oven. This offers the possibility of the positioning unit simultaneously serving as a delivery outlet portion. This simplifies the design of the charging arrangement.

In addition to switching from the positioning to the transfer position, a driving motor shifting the positioning arrangement in the positioning setting between individual positioning settings in which one positioning receptacle is associated with the charging portion for transferring a piece of dough serves for positioning the dough pieces, which simplifies the design of the charging arrangement.

A charging arrangement wherein the supply arrangement is provided with a plurality of individually controlled supply bins which can be emptied which are arranged floor-like on top of each other can be designed in a modular system. The storing volume of the individual supply bins can be dimensioned such that stored dough pieces will not be damaged by dough pieces that are on top of them.

An outlet flap which can be controllably shifted between an open and a closed position being associated with each supply bin with the outlet flap being biased in particular in the closed position ensures emptying control by simple means.

A supply bin with a bottom being provided as a roller path ensures safe and gentle conveyance of stored dough pieces.

A supply and delivery arrangement for the conveyance of the dough pieces to the supply outlet may comprise:
  a delivery bin with a bin bottom which is sub-divided into
    a round inner portion and into an in particular ring-shaped outer portion which at least partially surrounds the same,
  and wherein the outer portion is rotatably drivable relative to the inner portion around an axis of rotation which is vertically standing at the bin bottom level and is in delivery engagement with the supply outlet.

Such an arrangement provides for operationally safe separation of the dough pieces.

A drive of the inner portion around the axis of rotation independent of the outer portion and a baffle plate which is shaped in such a way that due to a relative movement between the baffle plate and the inner portion pieces of dough which initially are located on the inner portion are deflected to the outer portion ensure defined delivery of the dough pieces as far as to the supply outlet.

A supply and delivery arrangement which comprises an internal portion which can be driven around the axis of rotation with alternating direction of rotation precludes the risk of dough pieces jamming in the delivery bin.

A sensor for counting the conveyed dough pieces permits the throughput of the charging arrangement to be measures, it being possible that the throughput is evaluated in a central control unit for controlled supply.

A mobile bin support being part of the supply arrangement simplifies the charging job of the supply arrangement. This need not take place at the site of the rest of the baking system. Moreover, a greater number of bin supports can be provided so that replacing an empty bin support by a charged one can take place rapidly.

A charging arrangement having a dimensioning of a receptacle for the mobile bin support in such a manner that the bin support when inserted in the charging position is aligned relative to the downstream delivery components of the charging arrangement will lead to simplified handling of the supply arrangement.

An outlet sliding wall which can be controllably shifted between an open position and a closed position is associated with at least one supply bin ensures simple and safe emptying of the supply bins.

An outlet sliding wall being provided in the form of an articulated link wall that can be rolled up can be moved between the open and the closed position in a space-saving way.

An outlet sliding wall being associated with a plurality of supply bins enables a a bin support of compact design to be have a plurality of supply bins.

The charging arrangement may have an intermediate bin being provided in the conveyance path between at least one supply bin and the supply and delivery arrangement and being designed in such a manner that a partial quantity of dough pieces is discharged from the intermediate bin to the downstream components of the supply delivery arrangement. Such an intermediate bin precludes any undesirable overloading of the supply and delivery arrangement. Jams in the supply and delivery arrangement are thus prevented.

An intermediate bin being provided with an outlet the width of which can be adjusted serves to easily predetermine the quantity delivered thereby.

A bottom of an intermediate bin adjustable around an off-center axis between at least one open position and a closed position and determining in the respective set position the width of the outlet can be produced without any complicated requirements.

A supply and delivery arrangement being provided with an outer portion in the form of a slat conveyor belt ensures safe delivery of separated dough pieces.

The charging arrangement may have a separation deflector which cooperates with at least one separation sensor and which conveys, depending upon a signal of the separation sensor, the dough pieces which follow a first dough piece conveyed on the outer portion from the outer portion back to the inner portion separating deflector. Such a leads to reliable separation of dough pieces, which is accomplished even if the individual pieces tend to sticking together.

A sensor downstream of the separation deflector in the conveyance direction of the outer portion for recording dough pieces which are conveyed on the outer portion after the separation deflector further improves the reliability of separation.

The supply and delivery arrangement may have an outlet pusher which is associated with an outlet hoistway of the outer portion after the separation deflector and which conveys dough pieces transversely to the delivery direction of the outlet hoistway from the same to the delivery inlet portion of the lifting and delivery device. Such a separating deflector leads to safe conveyance of the dough pieces to the lifting and delivering device.

The charging arrangement may include a positioning arrangement for a set of dough pieces which comprises:
  a charging portion which is in delivery engagement with
    a delivery outlet portion of the supply delivery arrangement in such a manner that the dough pieces are conveyed from the delivery outlet portion to the charging portion under the influence of gravity,
  a positioning device which determines individual positions of dough pieces of a set of dough pieces,
  where the charging portion is part of the lifting and delivery device.

Such a positioning device produces a set of dough pieces prior to lifting delivery, putting into practice a lifting and delivering device of increased delivering capacity.

Advantageously the outlet pusher is the positioning device and is adjustable for providing the set of dough pieces over the length of the outlet hoistway. This enables the dough pieces that belong to a set to be safely positioned.

The charging arrangement may have a lifting and delivery arrangement lifting and delivering device can be implemented comparatively easily, ensuring gentle delivery of the dough pieces.

The advantages of a baking system with a charging arrangement according to the invention and a baking oven correspond to the advantages mentioned above in connection with the charging arrangement.

The baking system may have an extraction bin downstream of the baking oven which is provided with a switch element which can be switched to at least two switch positions and where the switch element determines in each switch position a transport path for dough pieces from the baking oven to an extraction shelf of the extraction bin that is associated with the switch position. Such a discharge bin allows various types of baked articles, which have been produced in the baking oven, to be sorted into the respective discharge shelves.

Regardless of the design of the charging arrangement, another essential aspect of the invention resides in an improvement of a baking system in such a way that accurate consumption data, for example the amount of rolls processed per day or week in the baking system, the distribution of processed amounts and types of dough pieces, and the entire economic use of the baking system can be determined and handled.

Details of the invention will become apparent from the ensuing description of exemplary embodiments of the invention, taken in conjunction with the drawing, in which:

DESCRIPTION OF A PREFERRED EMBODIMENT

Figure 1:
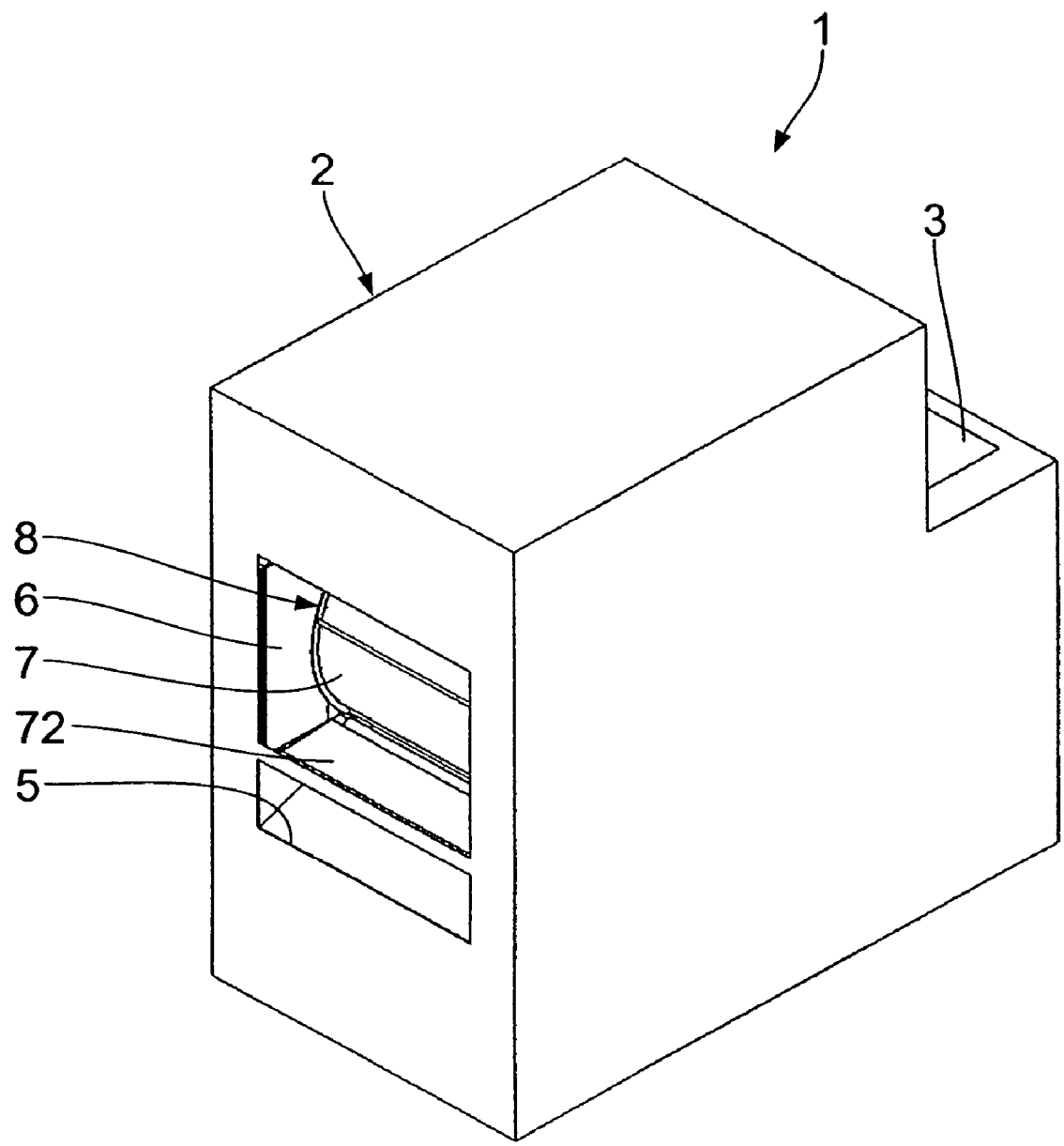
FIG. 1 is a perspective view of a baking system with a baking oven and a charging arrangement.

FIG. 1 is a perspective view of a baking system 1. A housing 2 of the baking system 1 has an inlet 3 for charging the baking system 1 with dough pieces 4, for example deep frozen or initially baked rolls, as well as an outlet 5 for discharge of baked dough pieces 4. The housing 2 further comprises a window 6 with a view of a horizontal baking drum 7 of a baking oven 8 of the baking system 1.

The inlet 3 has a height convenient and suitable for the baking system 1 to be charged by an operator. The baked dough pieces 4 will drop from the outlet 5 into a carrier (not shown).

FIGS. 2 to 6 illustrate internal details of the baking system 1, the housing 2 being omitted. A supply arrangement 9 of the baking system 1 is disposed downstream of the inlet 3; it is embodied as a supply carrousel. The supply arrangement 9 can be insulated or cooled so that the dough pieces 4 are for example kept frozen in the supply arrangement 9.

Figure 3:
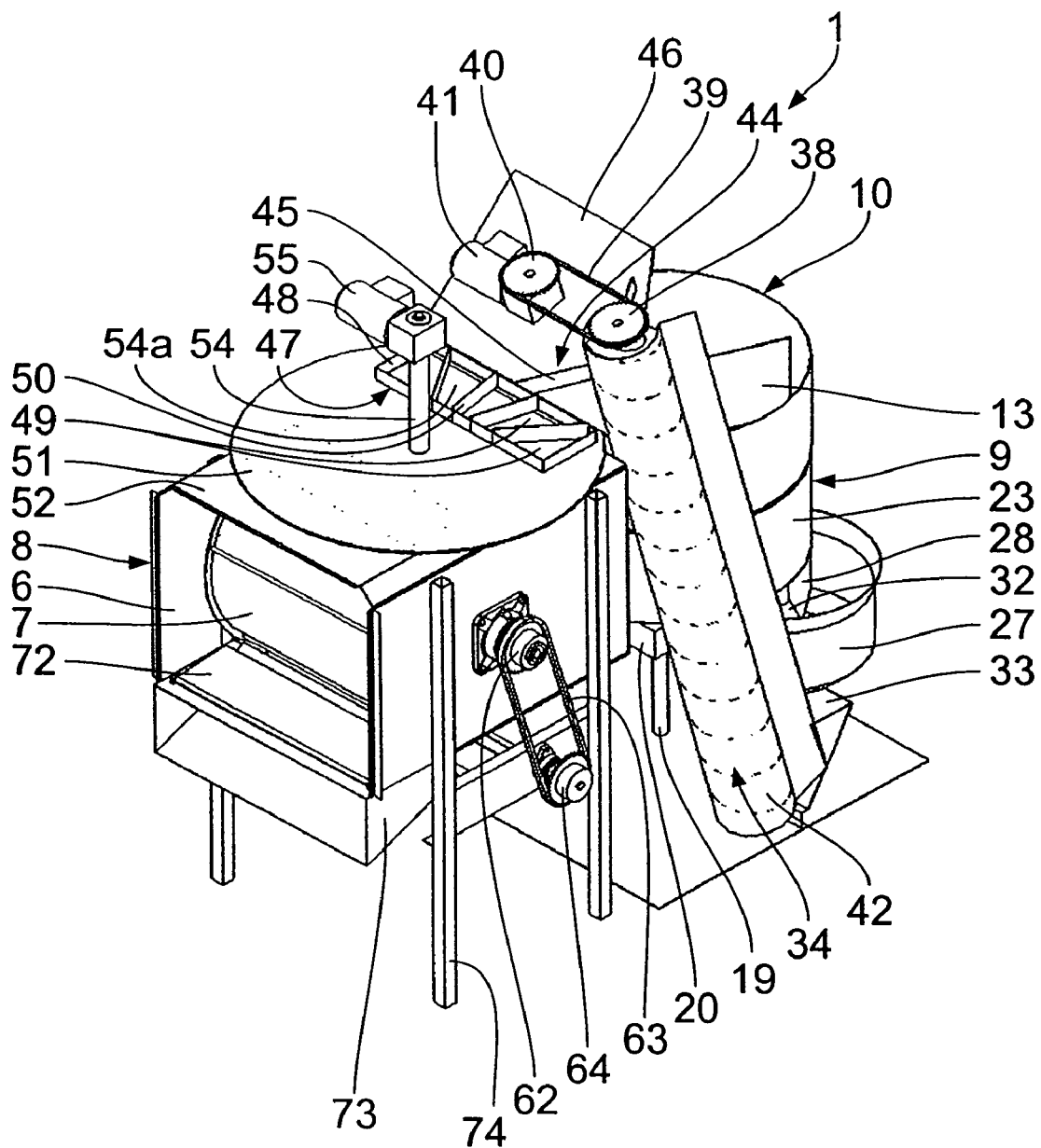
FIG. 3 is another perspective view of the baking system.
Figure 4:
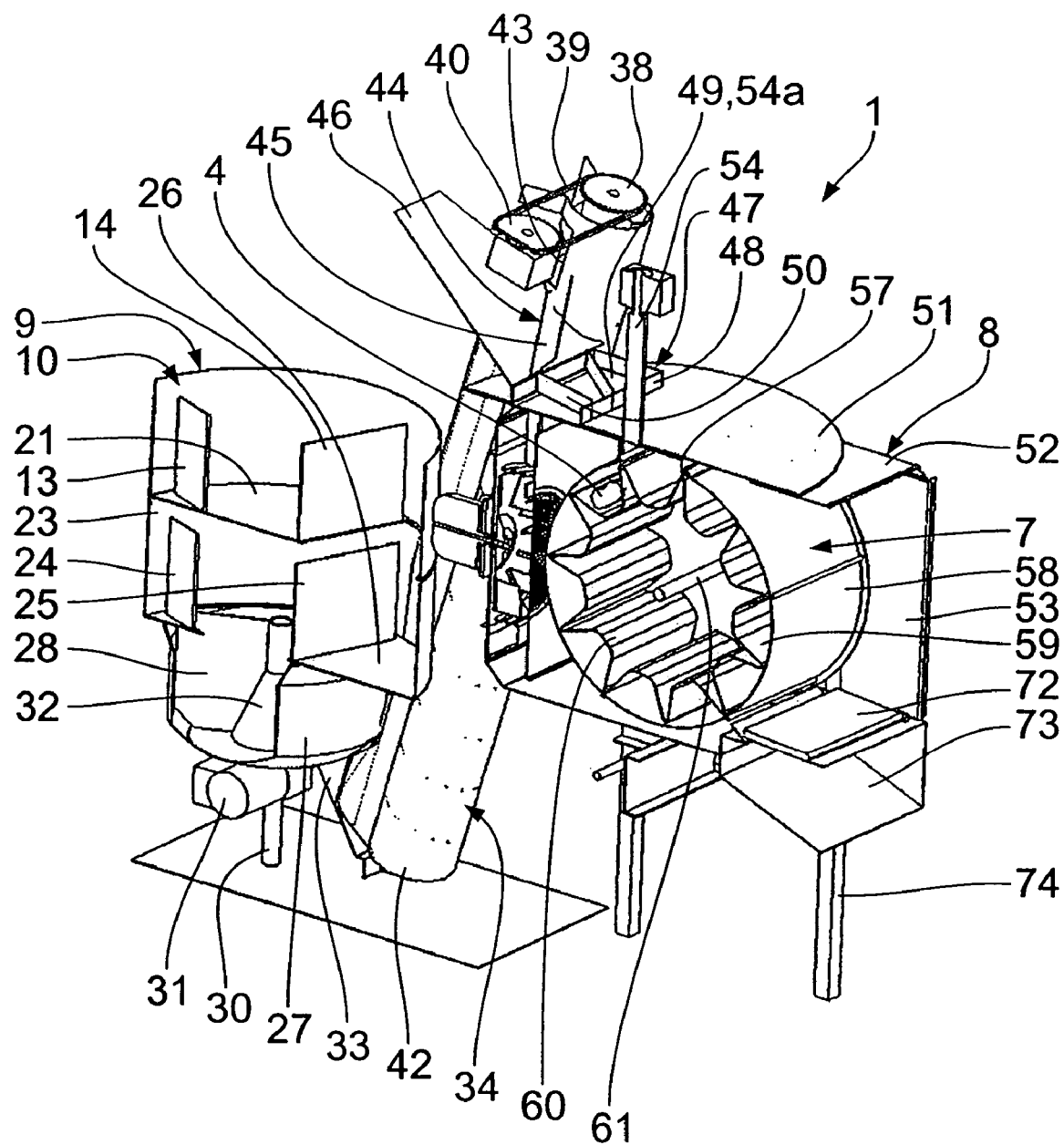
FIG. 4 is a perspective, vertical sectional view of the baking system perpendicular to the axis of rotation of a baking cylinder of the baking oven.

Preferably, such a cooled supply arrangement 9 is dimensioned for the baking system 1 to be run for at least an hour without the help of an operator. A first top cylindrical supply container 10, which is open upwards, is disposed directly downstream of the inlet 3. By a total of four parting walls 11 to 14 which extend radially from a central longitudinal axis of the supply bin 10, the first supply bin 10 is divided into four supply sectors 15 to 18. The parting walls 11 to 14 are non-rotatably joined to each other by way of a driving shaft 19 which extends along the longitudinal axis of the supply bin 10 and which is set rotating by a driving motor 20, part of which is seen in FIG. 3.

In the vicinity of the supply sector 18 that faces horizontally away from the inlet 3, a bottom 21 of the supply bin 10 comprises a passageway 22 in the shape of a sector. The bottom 21 is stationary in relation to the housing 2 of the baking system 1; it does not co-rotate upon rotation of the driving shaft 19. The passageway 22 provides for a passage from the first supply bin 10 to a second, bottom cylindrical supply bin 23 of the supply arrangement 9. The second supply bin 23 is in alignment with the first supply bin 10 and structured in the same way.

Figure 5:
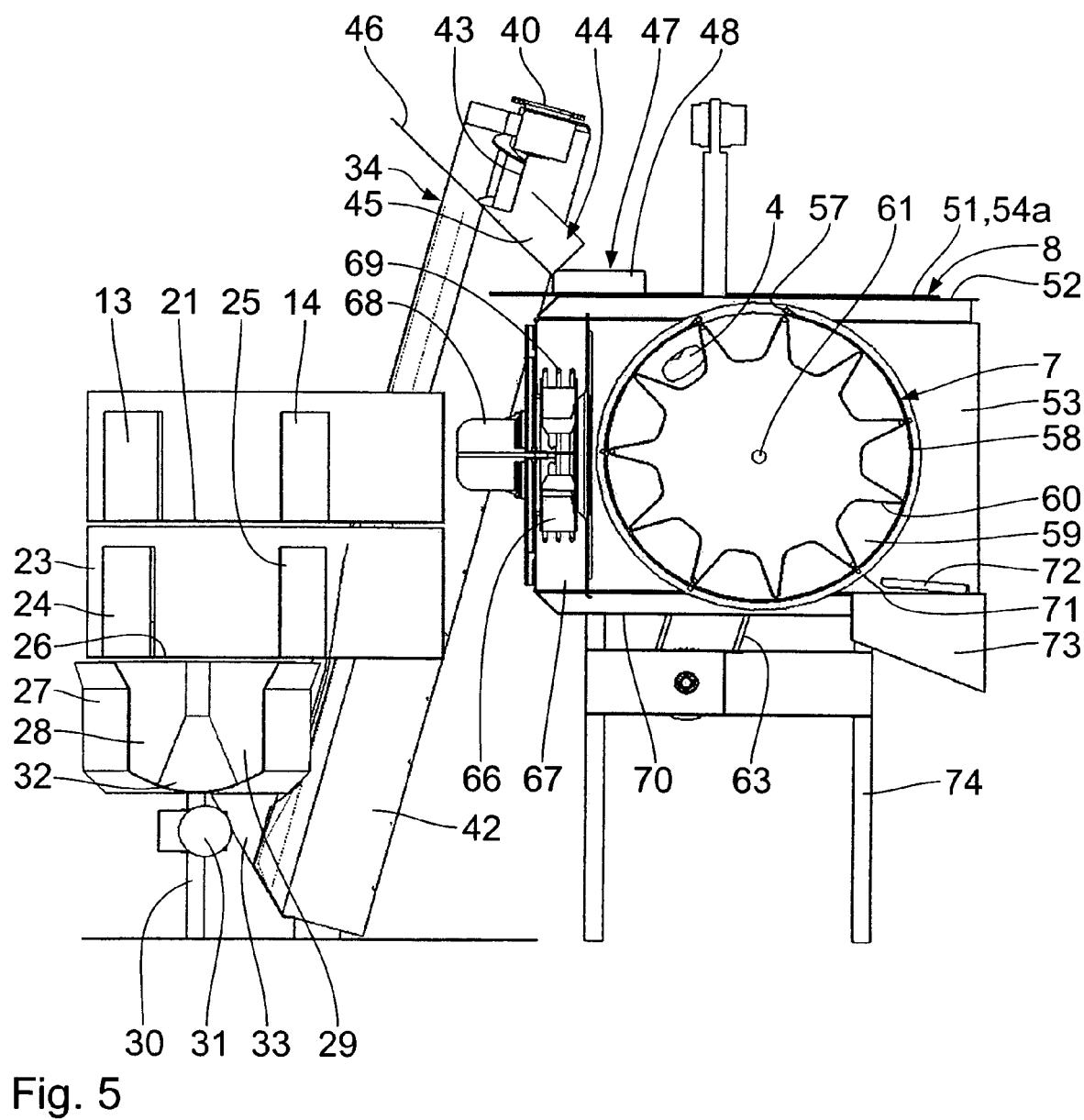
FIG. 5 is a section side view analogous to FIG. 4.
Figure 6:
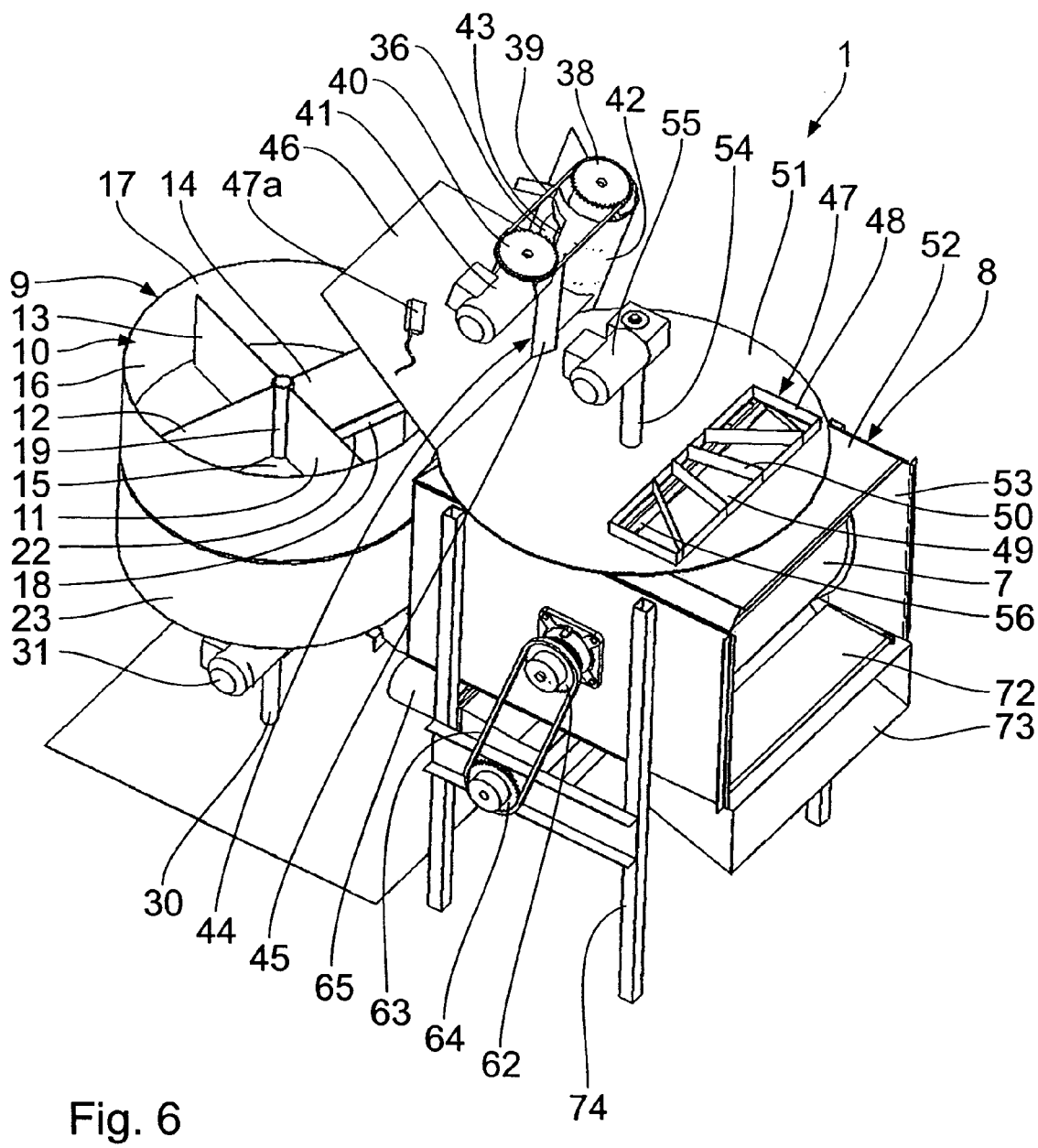
FIG. 6 is another perspective view of the baking oven, with a separating and positioning unit being displaced from a position of positioning into a position of transfer.

FIG. 5 illustrates that the bottom supply bin 23 too has parting walls for division into supply sectors, only two of the total of four parting walls, namely the parting walls 24, 25, being shown in FIG. 5. The parting walls of the second supply bin are non-rotatably joined to the driving shaft 19, engaging and disengaging by way of a magnetic clutch (not shown). The four parting walls of the bottom supply bin 23 are directly below i.e., in alignment with, the parting walls 11 to 14 of the top supply bin 10. Consequently, the supply sectors 15 to 18 of the top supply bin 10 are in alignment with those of the bottom supply bin 23. Corresponding couplings will ensure rotatability of the four parting walls of the bottom supply bin 23 irrespective of the rotatability of the parting walls 11 to 14 of the top supply bin 10.

Figure 2:
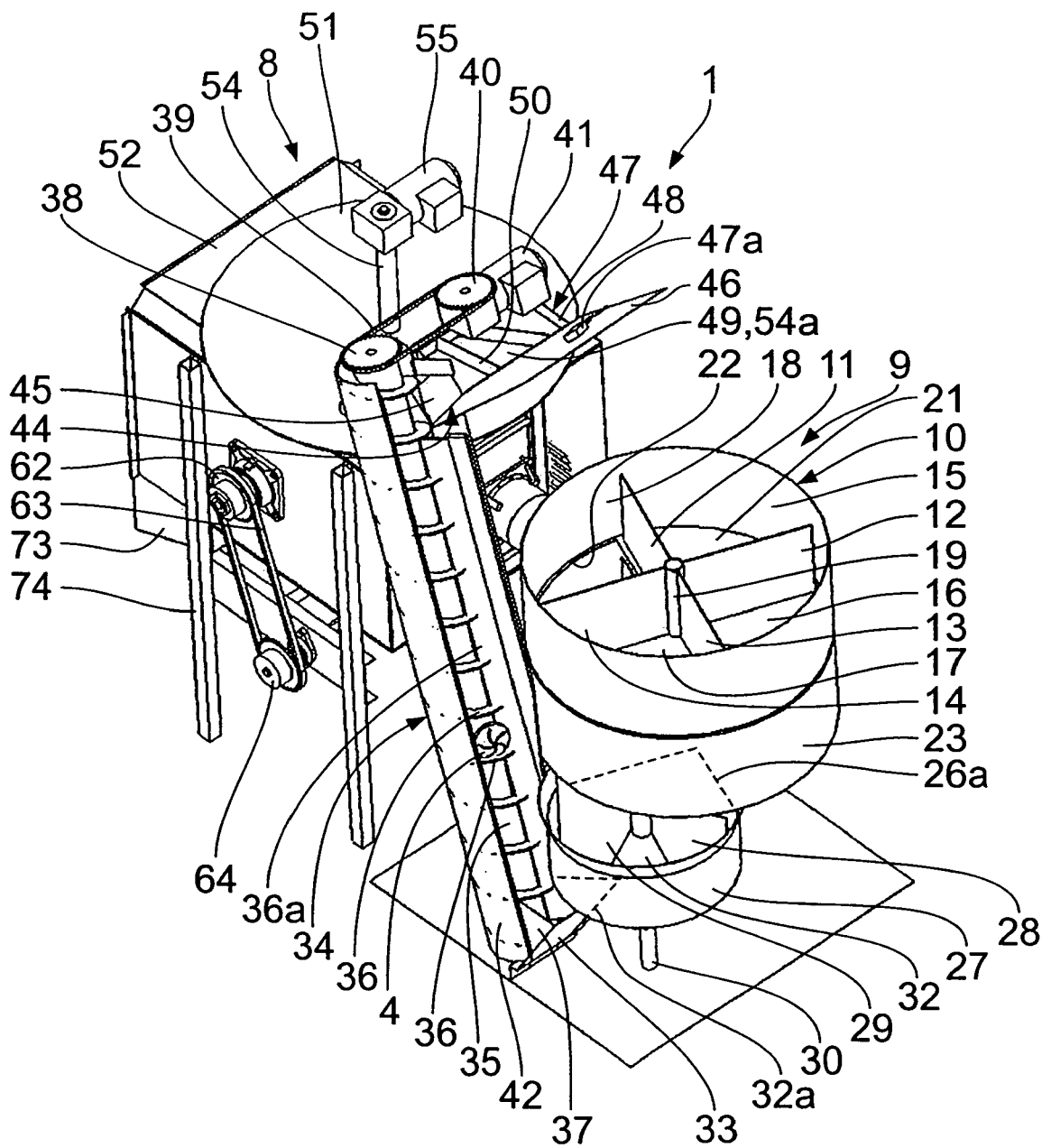
FIG. 2 is a perspective view of the baking system of FIG. 1 with the housing removed.

The bottom supply bin 23 too has a bottom 26 with a passageway 26a in the shape of a sector, which is roughly outlined by dashes in FIG. 2. The passageway 22 in the bottom 21 of the top supply bin 10 is displaced from the passageway 26a of the bottom supply bin 23 by a supply sector in the direction of rotation of the driving shaft 19. The passageway 26a in the bottom supply bin 23 provides for connection thereof with a delivery bin 27 of the supply arrangement 9.

The delivery bin 27 of substantially cylindrical shape is disposed below the bottom supply bin 23. Two plane delivery blades 28, 29 run in the delivery bin 27; they extend radially of a longitudinal axis of the delivery bin 27 and are non-rotatably joined to another driving shaft 30 that extends along this longitudinal axis. This shaft 30 can be set rotating by a driving motor 31. A deflection cone 32, which expands towards the bottom of the delivery bin 27, is mounted on the driving shaft 30 in the delivery bin 27. An outlet 32a, which is roughly outlined by dashes in FIG. 2, is provided in the bottom of the delivery bin 27; it is followed by a chute 33 which constitutes a delivery connection of the supply arrangement 9 with a lifting and delivering device 34. The lifting and delivering device 34 comprises an inclining upright feed screw 35, the flights 36 of which are spaced from each other, corresponding to some typical dimensioning of dough pieces 4. The distance between two adjacent flight 36 slightly exceeds the typical dimensions of the dough pieces 4, ensuring that a dough piece 4 can be safely transported, however precluding that two dough pieces 4, which lie one on top of the other along the longitudinal axis of the feed screw 35, are transported between two adjacent flights 36. Consequently, the dough pieces 4 are successively conveyed in the lifting and delivering device 34 along the spiral delivery path given by the feed screw 35. For support of the delivery function of the feed screw 35, a brush surface 36a cooperates therewith, preventing further rotation of the dough pieces 4.

A bottom delivery inlet portion 37 is disposed at the bottom end of the chute 33. At the opposite end, the feed screw 35 is provided with a gearwheel 38. Via the gearwheel 38, a driving chain 39 and another gearwheel 40, the feed screw 35 is driven for rotation about its longitudinal axis by a driving motor 41. At the top end of the lifting and delivering device 34, a housing 42, which partially encloses the feed screw 35, comprises a recess 43 that constitutes a delivery outlet portion of the lifting and delivering device 34. The recess 43 is followed by a chute 44 comprised of a vertically upright baffle plate 45 which is integrally molded on the housing 42, and of an equally integral, inclined plane 46 which descends towards the baking oven 8. The chute 44 constitutes a feed portion of a positioning device 47 for a set of a total of five dough pieces 4. The positioning device 47 has a positioning frame 48 as a positioning unit; this frame 48 is illustrated in FIGS. 2 to 5 in a position of positioning and in FIG. 6 in a position of transfer. When moving along the chute 44, the individual dough pieces 4 pass a light barrier 47a with a counter so that a complete set of dough pieces 4 is reliably delivered to the positioning frame 48. Once the last dough piece 4 that completes such a set has passed the light barrier 47a, a control unit that is connected with the light barrier 47a automatically stops the drive of the feed screw 35. The positioning frame 48 comprises a plurality of positioning receptacles 49 which are separated from each other by positioning and parting walls 50, each receptacle accommodating a dough piece. The positioning frame is non-rotatably connected with a rotary table 51 which is parallel to a top wall 52 of an interior casing 53 of the baking oven 8. The rotary table 51 is again non-rotatably connected with a driving shaft 54 which extends along the central axis thereof and is actuated by a driving motor 55. This motor 55 is tightly joined to a frame of the baking system 1 (which is not shown).

The positioning receptacles 49 do not possess a bottom. In the position of positioning, the bottom of the positioning receptacles 49 is formed by a second rotary table 54a between the first rotary table 51 and the wall 52. The second rotary table 54a is rotatable about the longitudinal axis of the driving shaft 54 independently of the first rotary table 51. The second rotary table 54a is joined to the driving shaft 54 by means of a magnetic coupling (not shown). In the position of transfer of FIG. 6, an inlet 56 in the second rotary table 54a and in the top housing wall 52 is in alignment with the positioning frame 48. In the position of transfer, the inlet 56 is in alignment with a passage 57 in an outer defining wall 58 of the baking drum 7. Receptacles 59 for individual sets of dough pieces 4 are defined inwards i.e., towards the longitudinal axis of the baking drum 7, by an inner defining wall 60 in the cross-sectional shape of a star. The defining walls 58, 60 are of air permeable stainless steel wire fabric. The baking drum 7 comprises a total of eleven receptacles 59. The extension of the passage 57 in the outer defining wall 58 in the circumferential direction about the longitudinal axis of the baking drum 7 corresponds to the extension of a receptable 59 in the circumferential direction. The outer defining wall 58 and the inner defining wall 60 are drivable in rotation about the longitudinal axis of the baking drum 7 independently of each other. To this end a central driving shaft 61, non-rotatably along the longitudinal axis of the baking drum 7, is connected to a gearwheel 62 and, via a driving belt 63 and another gearwheel 64, to a driving motor 65. The driving motor 65 actuates the inner defining wall 60 as well as the outer defining wall 58. To this end, another driving shaft (not shown) with two clutches is installed underneath the baking oven 8 parallel to the driving shaft 61. The first of these couplings serves as a locking brake for the outer defining wall 58, for example when the baking drum 7 is charged or emptied. During the baking job, both defining walls 58, 60 run synchronously i.e., the first clutch disengages and a second clutch in the driving shaft underneath the baking oven 8 engages. In this way, the turning moment can be conferred to both defining walls 58, 60 by this second driving shaft and the driving shaft 61.

The interior of the interior casing 53 constitutes a baking chamber of the baking oven 8, heated with circulating air that has a given path through the baking chamber. A fan rotor 66 in a rotor casing 67 serves for generating the circulating air; the rotor casing 67 continues the interior casing 53 towards the supply arrangement 9. The fan rotor 66 is actuated by a driving motor 68 about a horizontal axis. A heating spiral 69, which coaxially encircles the fan rotor 66 from outside, serves for heating the circulating air.

A bottom gate 71 is formed in a wall 70 of the interior casing 53, extending across the width of the interior casing 53 parallel to the receptacles 59; it can be closed by a flap 72. The flap 72 serves for heat insulation of the interior casing 53 to the outside. A discharging passageway 73 is disposed underneath the gate 71, leading to the outlet 5. The interior casing 53 is supported by a frame with four sustainers 74.

The baking system 1 is operated as follows: At first packing drums of dough pieces 4 are placed in readiness, which may contain for example 100 dough pieces 4. Through the inlet 3, the top supply bin 10 is filled with dough pieces 4 from the packing drums, the dough pieces 4 being distributed in the supply sectors 15 to 18 or dropping through the passageway 22 into the second supply bin 23. Then the dough pieces 4 are delivered from the supply arrangement 9 via the lifting and delivering device 34 and the positioning device 47 to the baking oven 8. To this end, the driving motor 20 is activated so that the parting walls 11 to 14 transport dough pieces 4 from the top supply bin 10 through the passageway 22 into the bottom supply bin 23. Since the parting walls of the two supply bins 10, 23, due to the couplings, can be rotated independently from one another, it is possible in this way to re-load dough pieces at any time prior to the supply bins 10, 23 being completely emptied. As soon as the top supply bin 10 has been emptied appreciably, it can be recharged through the inlet 3. Dough pieces 4 which drop through the passageway 22 into the bottom supply bin 23 are conveyed by the parting walls in the bottom supply bin 23 towards the passageway 26a in the bottom 26 of the bottom supply bin 23 and drops into the delivery bin 27. The displaced arrangement of the passageways 22, 26a in the bottoms 21 and 26 ensures that a great number of dough pieces 4 may be stored in the supply arrangement 9, it being possible to load both supply bins 10, 23 by at least three quarters, namely three of four supply sectors in the supply bins 10 and 23. Dividing the supply arrangement 9 into the two supply bins 10, 23 and the delivery bin 27 serves for limiting the maximum dumping height of the dough pieces 4. This precludes any damaging of lowermost dough pieces 4 by dough pieces that lie on top of them. The delivery blades 28, 29 transport the dough pieces 4 in the delivery bin 27 towards the bottom passageway 32a in the delivery bin 27. In doing so, the delivery blades 28, 29 rotate slowly so that only small doses of dough pieces 4 approach the delivery inlet portion 37. The deflection cone 32 ensures that the dough pieces 4 are sufficiently spaced radially from the driving shaft 30 in the bottom area of the delivery bin 27 so that it is moved by the action of gravity via the chute 33 towards the delivery inlet portion 37 of the lifting and delivering device 34. Feeding the dough pieces to the lifting and delivering device 34 takes place in such a way that dough pieces 4 first filled into the supply bins 10, 23 will be the first to be fed to the feed screw 35. This works in favour of hygiene and quality of the baked articles.

By the aid of the feed screw 35 of the lifting and delivering device 34, the dough pieces 4 are then transported at an angle upwards and separated until reaching the chute 44 through the recess 43. Controlled by the counter and the light barrier 47a, the feed screw 35 is stepwise actuated by the driving motor 41 so that a set of five dough pieces 4 at a time moves via the chute 44 to the positioning frame 48. The positioning frame 48 is positioned in relation to the bottom end of the chute 44 for the first dough piece 4 of a set to reach one of the outermost positioning receptacles 49, for example the one that leads clockwise. This associated position constitutes a single positioning position of the positioning device 47. The dough piece 4 housed in this positioning receptacle 49 at first constitutes a barrier preventing further dough pieces 4 of a set from following up. In the positioning position, the second rotary table 54a is positioned relative to the first rotary table 51 in such a way that the second rotary table 54a forms the bottom of the positioning receptacle 49. By actuation of the driving motor 55, the positioning frame 48 is then rotated a bit further clockwiseabout the driving shaft 54 so that the next positioning receptacle 49 is allocated to the end portion of the chute 44. The second rotary table 54a co-rotates synchronously. The next dough piece 4 of the set of dough pieces moves from the chute 44 into this second positioning receptacle 49. The driving motor 55 is activated stepwise sufficiently long for each positioning receptacle 49 of the positioning frame 48 to hold a dough piece 4 of the set. In this way, the dough pieces 4 can be arranged in parallel to a receptacle 59.

Then the driving motor 55 is actuated until the positioning frame 48 has been conferred from the position of positioning into the position of transfer. The second rotary table 54a at first co-rotates synchronously. After the first rotary table 51 has reached the position of transfer, the second rotary table 54a is rotated by approximately 90° so that the inlets 56 provided in the second rotary table 54a and in the top housing wall 52 are flush. The dough pieces 4 then drop through the inlet 56 and through the passageway 57, in alignment therewith, of the outer wall 58 of the baking drum 7 and into a first receptacle 59. In the baking system 1, the positioning frame 48 simultaneously constitutes a positioning unit giving positions relative to each other of the dough pieces 4 of the set and an outlet portion for transfer of the dough pieces 4 from the positioning device 47 to the baking oven 8. Then, by activation of the driving motor 65, the inner wall 60 of the baking drum 7 is rotated by another step so that the next receptacle 59 is allocated to the passageway 57. The outer wall 58 remains stationary. By parallel action, the positioning frame 48 is returned into the position of positioning and the feed screw 35 is actuated so that the next set of dough pieces 4 is provided via the chute 44. The second rotary table 54a is in a position relative to the first rotary table 51 in which it defines a bottom for the receptacles 59.

This process is repeated sufficiently long for ten of the eleven receptacles 59 to be filled with a set of dough pieces 4.

Then the outer wall 58 is rotated in relation to the inner wall 60 so that the passageway 57 is allotted to the receptacle 59 that is still empty. The baking process now starts, with the two walls 58, 60 of the baking drum 7 rotating synchronously and heated recirculating air flowing around the dough pieces. By the aid of vaporization means (not shown), the dough pieces can be treated with vapour during a baking process. The temperature in the baking oven 8 during the baking process is regulated by a baking program. After the end of the baking process, which may for example take 10 to 12 minutes, the baking drum 7 is rotated such that the passageway 57 is located above the passageway 71 of the housing wall 70. The flap 72 is opened and the inner wall 60 is rotated while the outer wall 58 is stationary, with the dough pieces 4 dropping from the receptacles 59 through the passage way 71. The inner wall 60 continues to rotate until all the receptacles 59 are empty. Then the flap 72 is shut again. The baked dough pieces 4, by the action of gravity, slip through the discharge passageway 73 and the outlet 5, dropping into the carrier.

In a varied embodiment of the baking system 1 which is not illustrated, the supply arrangement is equipped with supply bins that are replaceable for charging the supply arrangement 9. They may be designed for example in the way of the supply bin 10, with the parting walls 11 to 14, for replacement of the supply bin 10, being removable together with the upper portion of the driving shaft 19. Of course, in this alternative embodiment, the inlet 3 must be dimensioned such that the supply bin can be withdrawn.

Upon operation of this embodiment of the baking system, the operator waits until the supply bin has been emptied in the course of the baking process. Then this emptied supply bin is replaced by a filled supply bin. Re-charging may take place at any time, for example even during operation of the baking oven 8.

A vibrating surface may take the place of a feed screw in the lifting and delivering device 34. Vibrating feed surfaces of this type are known to those skilled in the art.

Instead of the feed screw 35, the lifting and delivering device 34 may also have a circulating conveyor belt which is inclined for conveyance of the dough pieces 4, overcoming a difference of level. In particular, a conveyor belt of this type may incline by 900 towards a horizontal line i.e., it can be vertical. A conveying surface of the inclined conveyor belt may be embodied as a brush face for good frictionally engaging contact with the dough pieces 4 to be produced. In the case of a vertical conveying surface, a rigidly mounted baffle plate is allocated at a distance therefrom, with the conveyed dough pieces, by a surface opposite the conveying surface, being in contact with the baffle plate so that the dough pieces 4 are prevented from dropping off the conveying surface. Instead of a baffle plate, which may also be used for conveying surfaces of slopes other than 90°, a second guide belt can be employed, which is also a continuously encircling belt, running synchronously with the first conveyor belt. The dough pieces 4 transported in this alternative lifting and delivering device run between the conveying surface on the one hand and the guide belt on the other.

The lifting and delivering device can be designed for provision of the set of dough pieces in a position of the dough pieces relative to each other that is suitable for take-up by the baking oven. A positioning device, such as the positioning device 47, can then be omitted. Separation upstream thereof can take place for example by a centrifugal separator, in particular a centrifuge.

The above baking system may be equipped in such a way that the kind and number of baked dough pieces in the baking oven 8, for subsequent evaluation, can be determined during a certain baking period that may include several baking jobs. To this end, the packing drums, in which the dough pieces 4 are provided for charging the top supply bin 10, or the supply bins themselves—in the case of replaceable supply bins—have labels containing information on the nature and number of dough pieces in the respective drum. This information can be applied to the packing drums or the replaceable supply bins for example in the form of a bar code such as an EAN code. Instead of a bar code, this information may also be placed on an RFID chip, which may in particular be a flat chip. Chips of this type for radio frequency identification (RFID) are commercial. When the baking system 1 is charged, the label information, in addition to the instant of charging, is transmitted to a control computer of the baking system 1. This can take place for example automatically by the aid of a computer clock and by the aid of a scanner for bar code detection, for example a laser scanner attached to the baking system 1. By alternative, the label information may be available in plain text, with the operator, when charging the baking system 1, passing this information and the time of charging via a corresponding input unit to the control computer of the baking system. After the baking system 1 has been charged, the dough pieces are delivered to the baking oven 8 where they are baked as specified above. The label information detected by the control computer is collected and coordinated for a baking period of several baking processes, for instance for a day or a week. The label information thus obtained is then evaluated for optimization of baking-system operation. To this end, the type of dough pieces frequently baked in the oven 8 is for example detected so that a corresponding quantity of these dough pieces can be kept in store. Types of dough pieces that are baked less frequently must be stored in lower numbers. Long-term evaluation may serve for determination of for example a weekly cycle of customer behaviour. It is for example possible, by evaluation of label information, to find out whether the demand for certain types of baked articles is higher at weekends than on working days. To this end, use is also made of the evaluation of information as to when precisely a certain packing drum has been charged, for example on which day of the week and at which time. In addition to a weekly cycle, detection of a daily rhythm is conceivable just as well. Via the outlet 5, finished baked articles 4 arrive in the carrier. This carrier may be provided with an instrument that determines the quantity it holds, for example scales. Operation of the baking oven 8 is controlled by way of the quantity of baked dough pieces 4 collected in the carrier. This takes place by a given minimum amount of baked dough pieces 4. As soon as the quantity falls short of this minimum amount, the baking system 1 is set to work. This takes place as long as dough pieces 4 are available in the supply arrangement 9. When the supply arrangement 9 is empty, the baking system 1 emits for example an optical or acoustic signal for renewed charging of the supply arrangement 9.

It is also conceivable to replace the carrier at the outlet 5 by a withdrawal container that is accessible to the customers.

FIGS. 7 to 13 illustrate a supply arrangement 75 for dough pieces 4 that may be used alternatively of the supply arrangement 9 in the baking system 1. The supply arrangement 75 comprises a total of sixteen shelves 76 as a supply bin. Each shelf 76 has a bottom 78a that inclines downwards from an outer inlet portion 77 to an inner outlet portion 78. The shelves 76 are supported by a supporting frame 79 of a movable supply transport carriage 80, which has four sustainers 81 each with a caster 82. The transport carriage 80 has a handle 83 of being moved by an operator.

The outlet portions 78 of eight of the 16 shelves 76 are open towards two opposite front sides of the transport carriage 80. The eight shelves 76, which are allocated to one of these two front sides of the transport carriage 80, are provided in the form of two times four side by side shelves i.e., they are arranged in two side by side groups of four. The side by side shelves 76 have continuous bottoms 78a and are separated by a vertical, continuous central parting wall 84. The shelf area of the supply arrangement 75 is disposed in symmetry to the parting wall 84.

Figure 8:
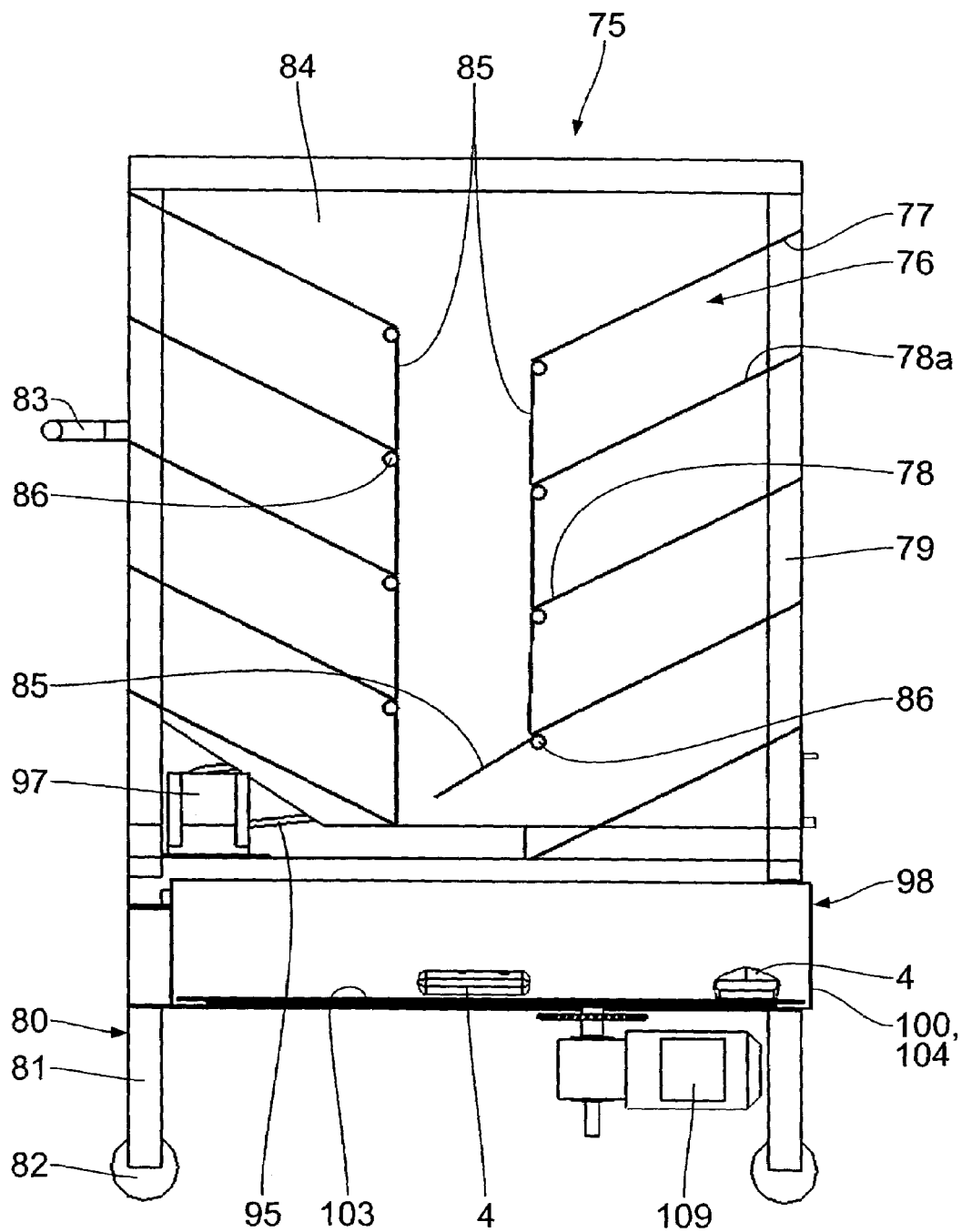
FIG. 8 is a vertical sectional view of the supply arrangement according to FIG. 7 parallel to a center plane of the supply arrangement that is perpendicular to shelves of supply bins.
Figure 9:
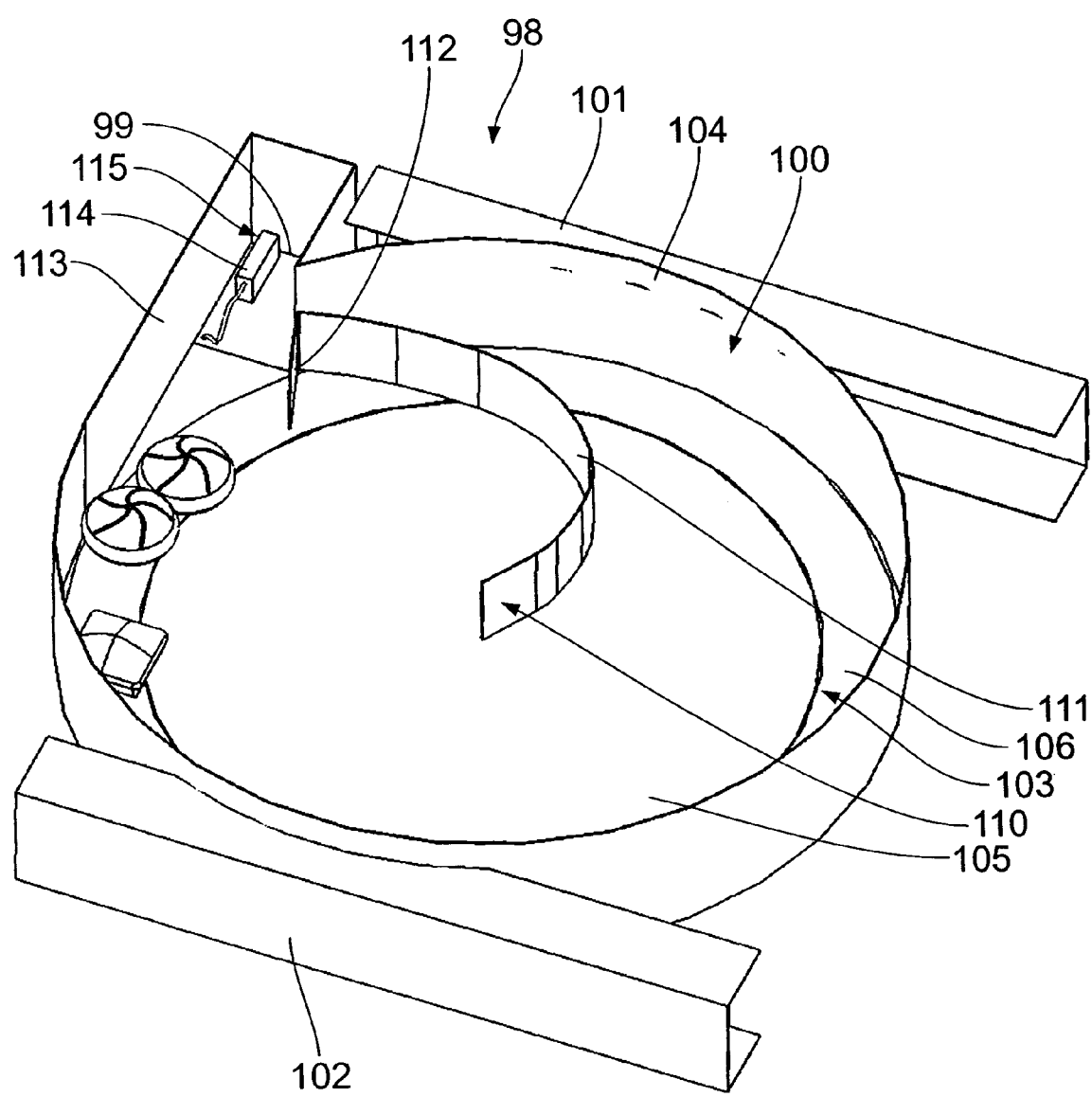
FIG. 9 is a perspective view of a supply and delivery arrangement of the supply arrangement of FIGS. 7 and 8 for delivery of dough pieces towards the supply outlet.
Figure 10:
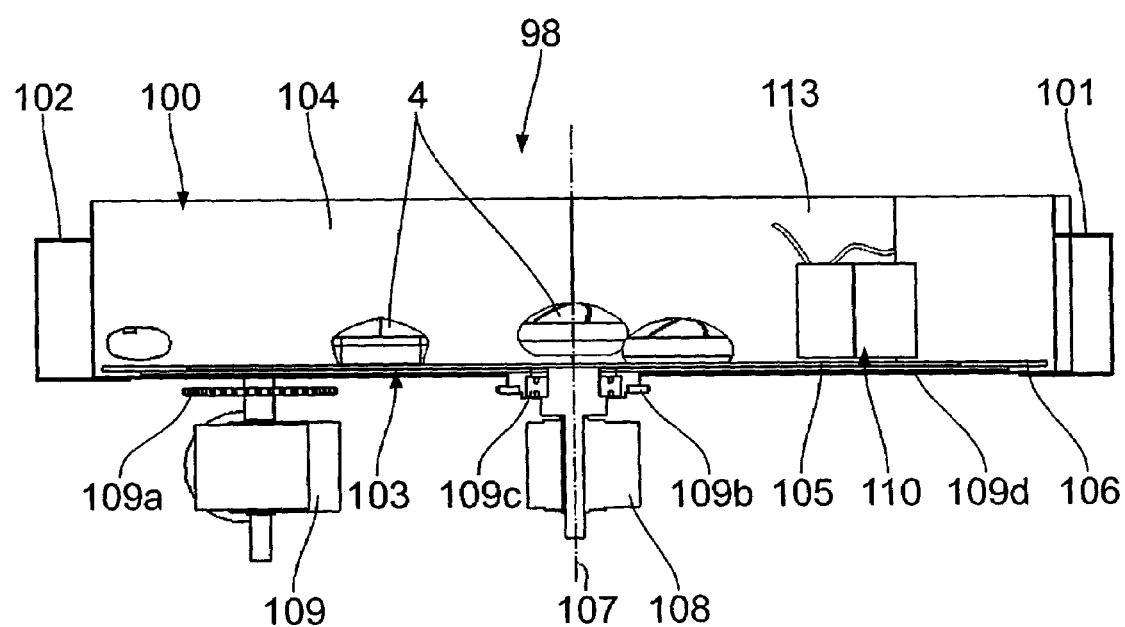
FIG. 10 is a sectional view, perpendicular to the cutting plane of FIG. 8, of the supply and delivery arrangement of FIG. 9.
Figure 11:
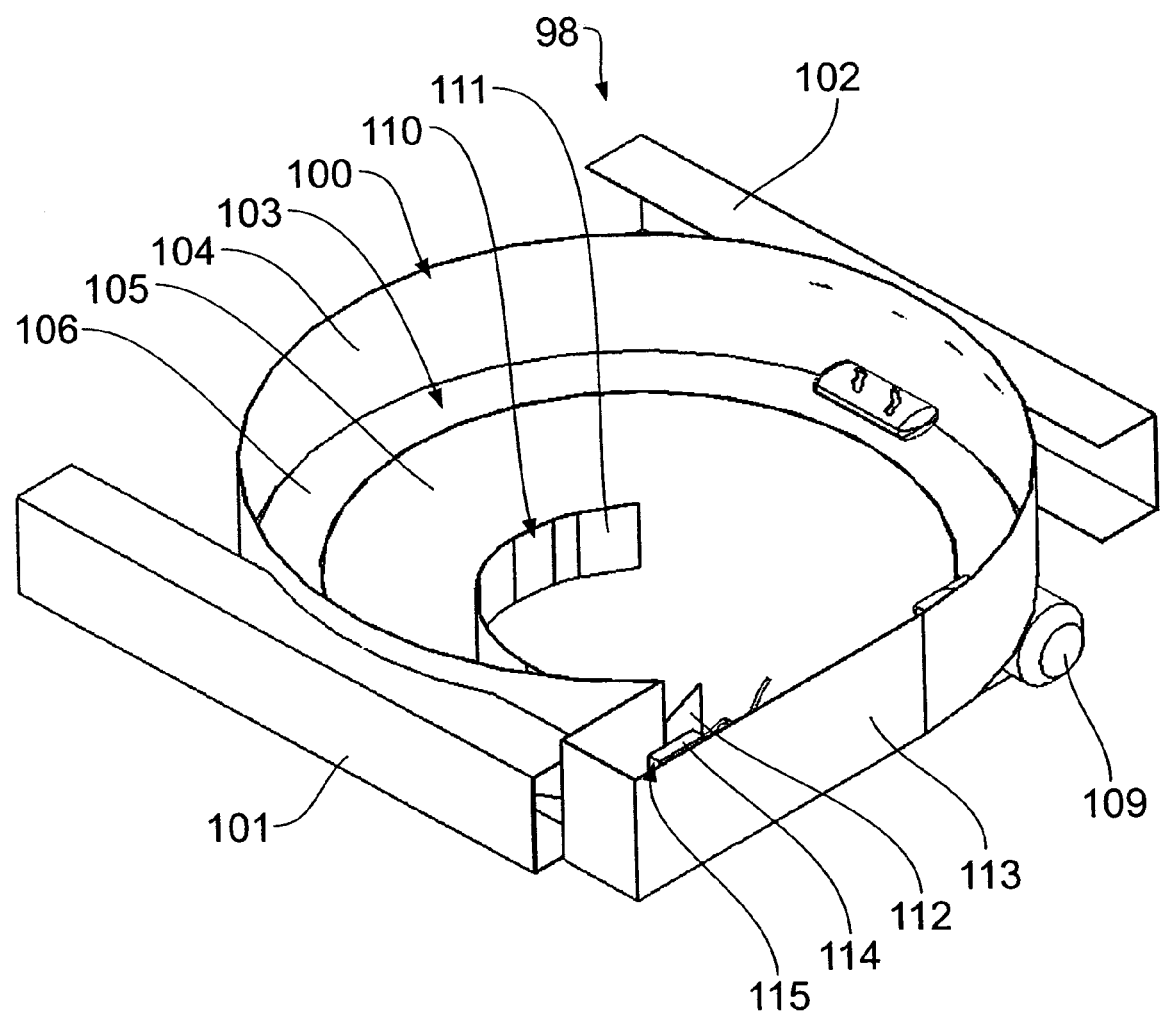
FIG. 11 is another perspective view of the supply and delivery arrangement of FIGS. 9 and 10.

The outlet portions 78 of the shelves 76 are closable by the aid of outlet flaps 85 which are pivotable, by way of a horizontal pivot joint 86, between a closed position in which they shut the outlet portion 78, and an open position in which discharge from the respective shelf 76 is possible. By the aid of a spring, the outlet flaps 85 are pre-loaded in the closed position. FIG. 8 illustrates the outlet flap 85 of the shelf 76 that is shown at the bottom right in the open position, and the other outlet flaps 85 in the closed position.

Figure 7:
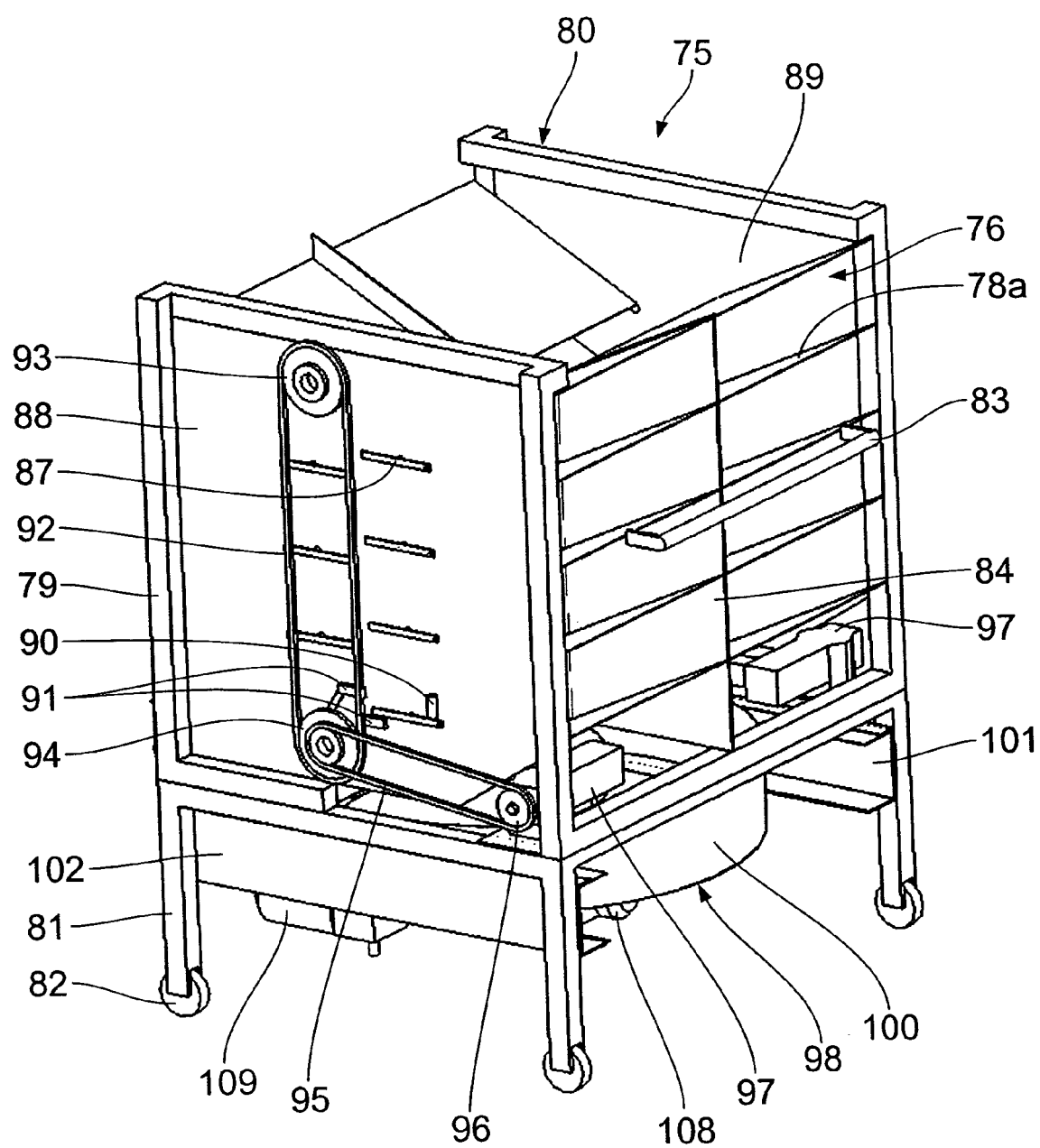
FIG. 7 is a perspective view of an alternative supply arrangement for the baking system of FIGS. 1 to 6.

In prolongation of the pivot joints 86 of each outlet flap 85, an operating lever 87 is non-rotatably allocated to each of the outlet flaps 85. The total of sixteen operating levers 87 pass through opposite side walls 88, 89 of the transport carriage 80 that are parallel to the parting wall 84 so that actuation of the operating levers 87 takes place through the side walls 88, 89 and separated from the shelves 76. In a closed position, the operating levers 87 are pre-loaded by springs 90 which are held by the respective side wall 88, 89. As a result of the arrangement of the shelves 76, the operating levers 87 which pass through one of the side walls 88, 89 are provided in two groups of four one on top of the other. An entrainer 91 serves for dislocation of the operating levers 87 of one of these groups of four so that two entrainers 91 are provided for the operating levers 87 of one side wall 88, 89. The two entrainers 91 that are allocated to one side wall 88, 89 are rigidly connected with a continuous driving chain 92 which is led along two deflection pinions 93, 94 one arranged on top of the other. They are supported by the side wall 88, 89 allocated to them. The respective bottom deflection pinion 94 is driven by way of another continuous driving chain 95 and a driving pinion 96 of a driving motor 97. FIG. 7 shows the operating lever 87 of the shelf 76 on the bottom left that is turned towards a viewer in an open position and the other operating lever 87 in the closed position.

In the supply arrangement 75, a supply and delivery arrangement 98 is disposed downstream of the outlet portions 78 of the shelves 76, delivering the dough pieces towards a supply outlet 99. In the supply arrangement 75, the supply and delivery arrangement 98, details of which are seen in FIGS. 9 to 13, replaces the delivery bin 27 with the delivery blades 28, 29 of the supply arrangement 9 of the embodiment according to FIGS. 1 to 6.

The supply and delivery arrangement 98 comprises a substantially round delivery bin 100 which is supported by two opposed, U-shaped supporting sections 101, 102 which are again fixed to the sustainers 81 of the transport carriage 80. The delivery bin 100 has a round bottom 103 and a substantially hollow cylindrical wall 104. The bottom 103 is divided into a round inner portion 105 and an annular outer portion 106 encircling the latter. The inner portion 105 and the outer portion 106 are independently drivable in the way of a turntable about a common central axis of rotation 107 which is perpendicular to the plane formed by the bottom 103. The inner portion 105 is rotatable about the axis of rotation by the aid of a driving motor 108 which is fixed underneath the bottom 103 to the supporting frame 79 of the transport carriage 80. A driving motor 109, which is also disposed underneath the bottom 103 and fixed to the supporting frame 79, serves for rotating the outer portion 106. To this end the driving motor 109 actuates a driving pinion 109a which actuates a transmission pinion 109b via a driving chain (not shown). The transmission pinion 109b is rotatable about the axis of rotation 107, mounted by way of an axial radial bearing 109c that is also fixed to the supporting frame 79. By way of extension arms 109d, the transmission pinion 109b is non-rotatably joined to the outer portion 106.

A baffle plate 110 is rigidly connected to the wall 104, having a first curved baffle portion 111 and a second, straight baffle portion 112 that is short as compared to the first portion. Both baffle portions 111, 112 extend closely above the bottom 103 so that they are able to direct any dough pieces 4 disposed thereon. As seen in particular in the plan view of FIG. 12, the longer baffle portion 111, proceeding from the wall 104, extends in a bow of clockwise increasing curvature as far as to the area above the center of the inner portion 105. The short baffle portion 112 substantially covers the entire width of the outer portion 106. In the vicinity of the short baffle portion 112, the wall 104, which is otherwise closed, is interrupted, with an outlet portion 113 of the supply and delivery arrangement 98 being contiguous thereto. The outlet portion 113 at first continues the bottom 103 outside the outer portion 106 for a bit, then the supply outlet 99 adjoins. A sensor element 114 of a sensor 115 projects into the supply outlet 99, counting the dough pieces 4 that pass the supply outlet 99. The sensor 115 may for example be a light barrier. The supply arrangement 75 and the supply and delivery arrangement 98 is used as described below in exchange for the supply arrangement 9 of FIGS. 1 to 6: In a charging station, all the shelves 76 of the transport carriage 80 are filled, with all the outlet flaps 85 being in the closed position. Then the transport carriage 80 is positioned in the baking system 1 in such a way that the supply outlet 99 is located above the chute 33 that leads to the lifting and delivering device 34. The position of the supply outlet 99 corresponds to that of the supply outlet 32a of the embodiment of the supply arrangement 9 according to FIGS. 1 to 6.

Upon operation of the baking system 1, separated dough pieces 4 are fed as required via the supply and delivery arrangement 98 from the shelves 76 to the lifting and delivering device 34. To this effect, the driving motors 97, controlled by the central control unit of the baking system 1, are triggered so that the entrainers 91 sequentially displace the operating levers 87 from the closed position into the open position, with the associated outlet flaps 85 opening and the dough pieces stored in the respective shelves 76 being transferred from the respective outlet portion 78 towards the delivery bin 100 of the supply and delivery arrangement 98. The respectively actuated driving motor 97 stops as soon as the outlet flap 85 is entirely open. At first, the dough pieces 4 drop predominantly on the inner portion 105 of the bottom 103 of the delivery bin 100.

Figure 12:
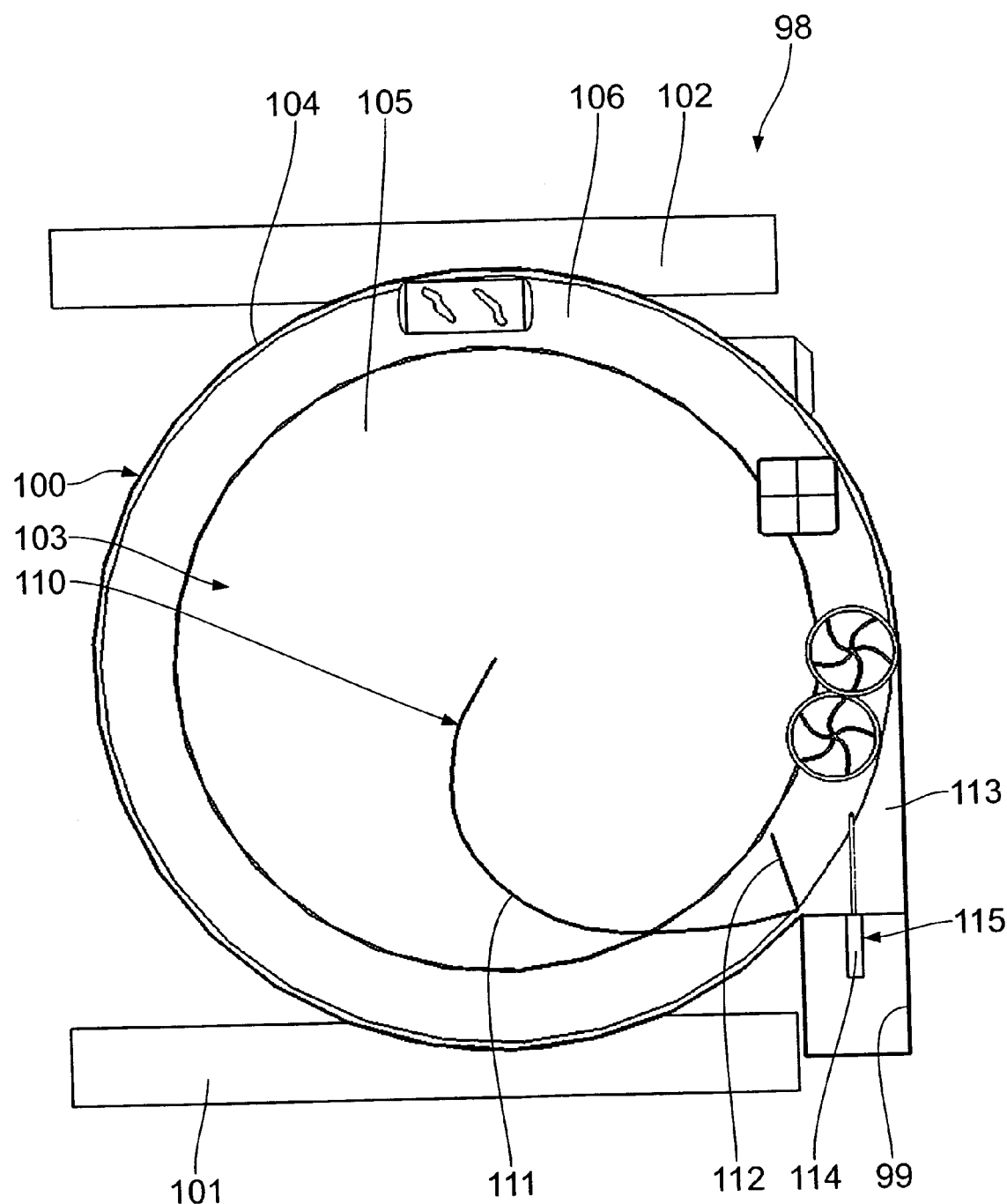
FIG. 12 is a plan view of the supply and delivery arrangement of FIGS. 9 to 11.
Figure 13:
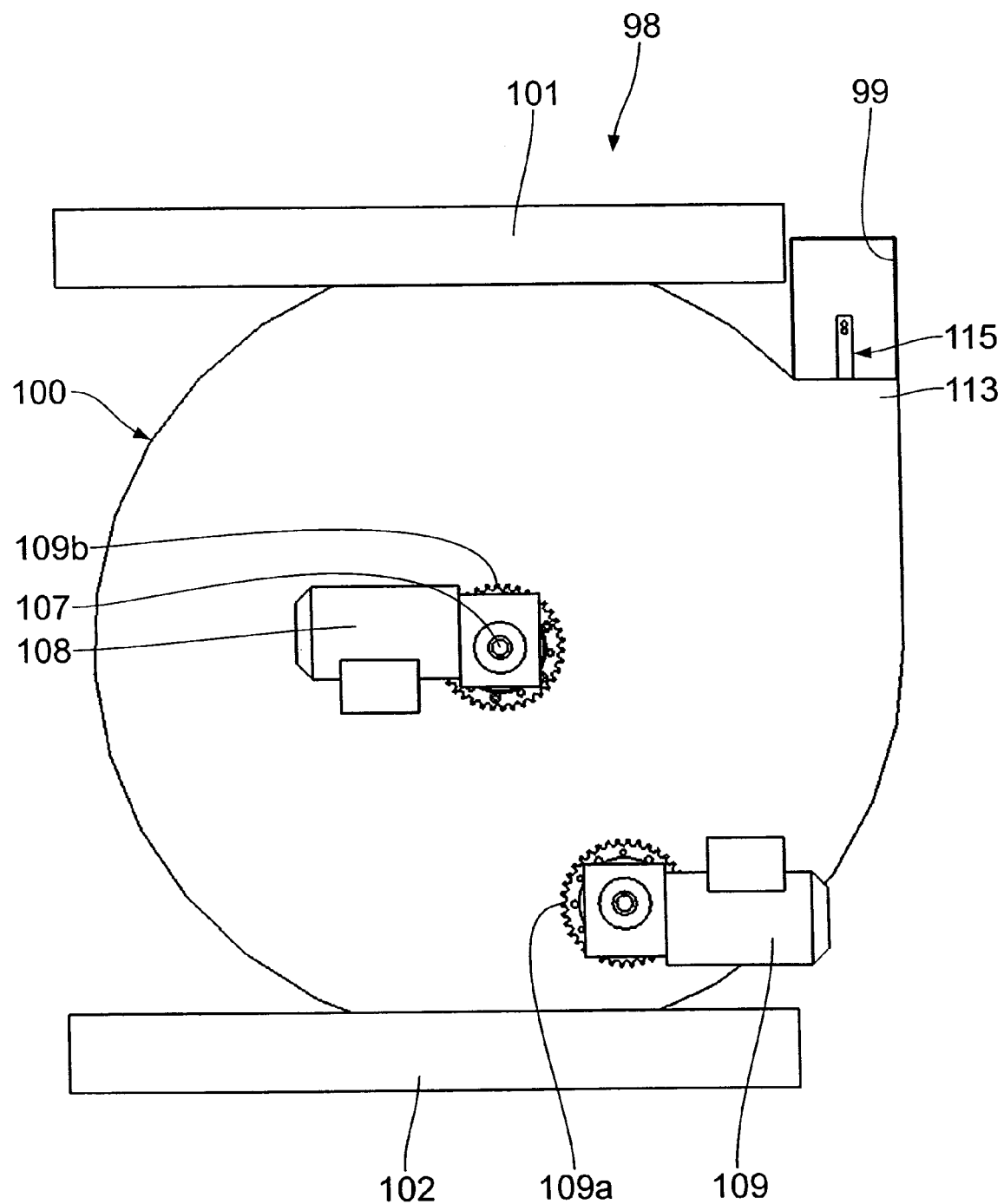
FIG. 13 is a view from below of the supply and delivery arrangement of FIGS. 9 to 12.
Figure 14:
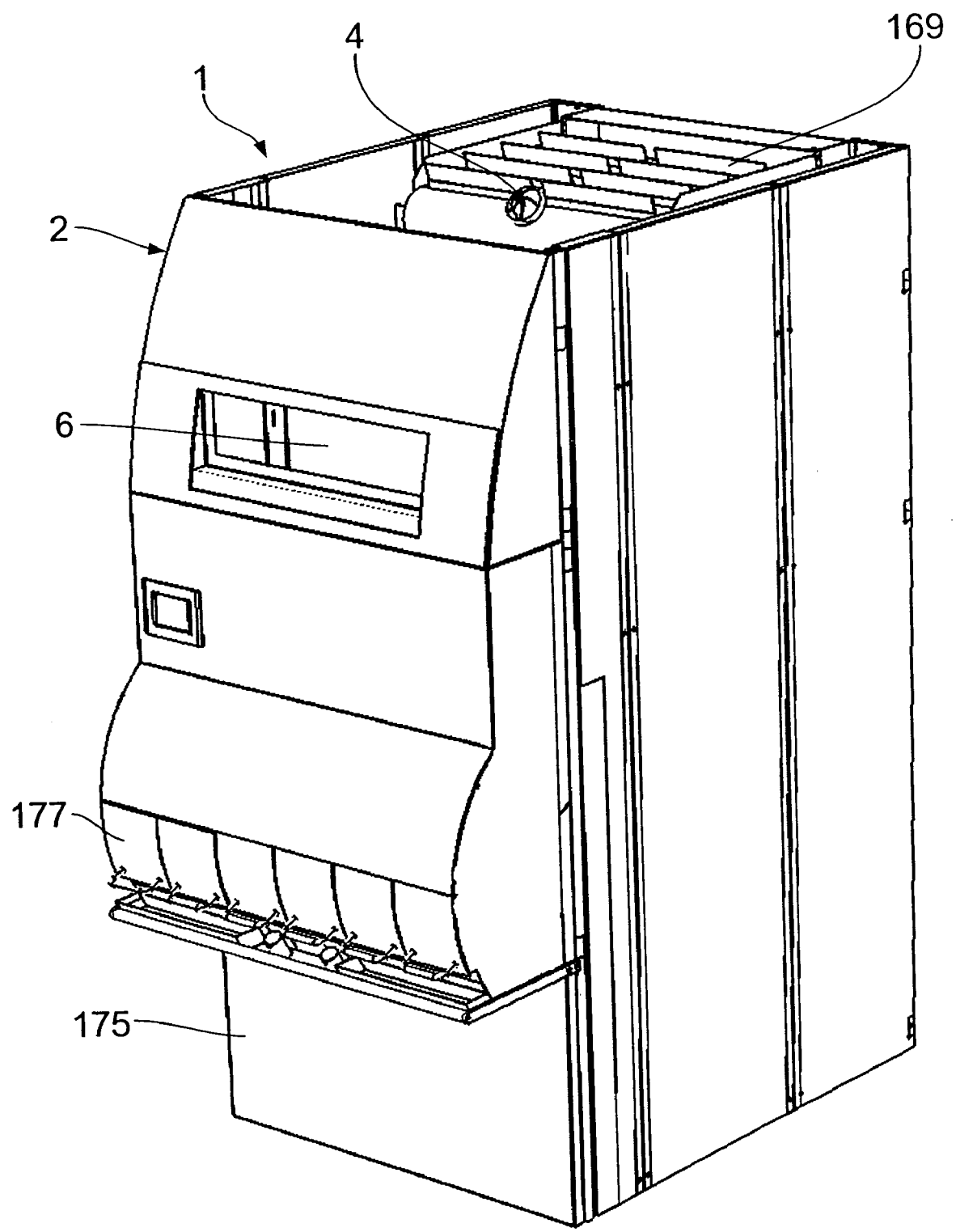
FIG. 14 is a perspective view of an alternative baking system with a baking oven, a charging arrangement therefor, and a discharge bin downstream of the baking oven.
Figure 15:
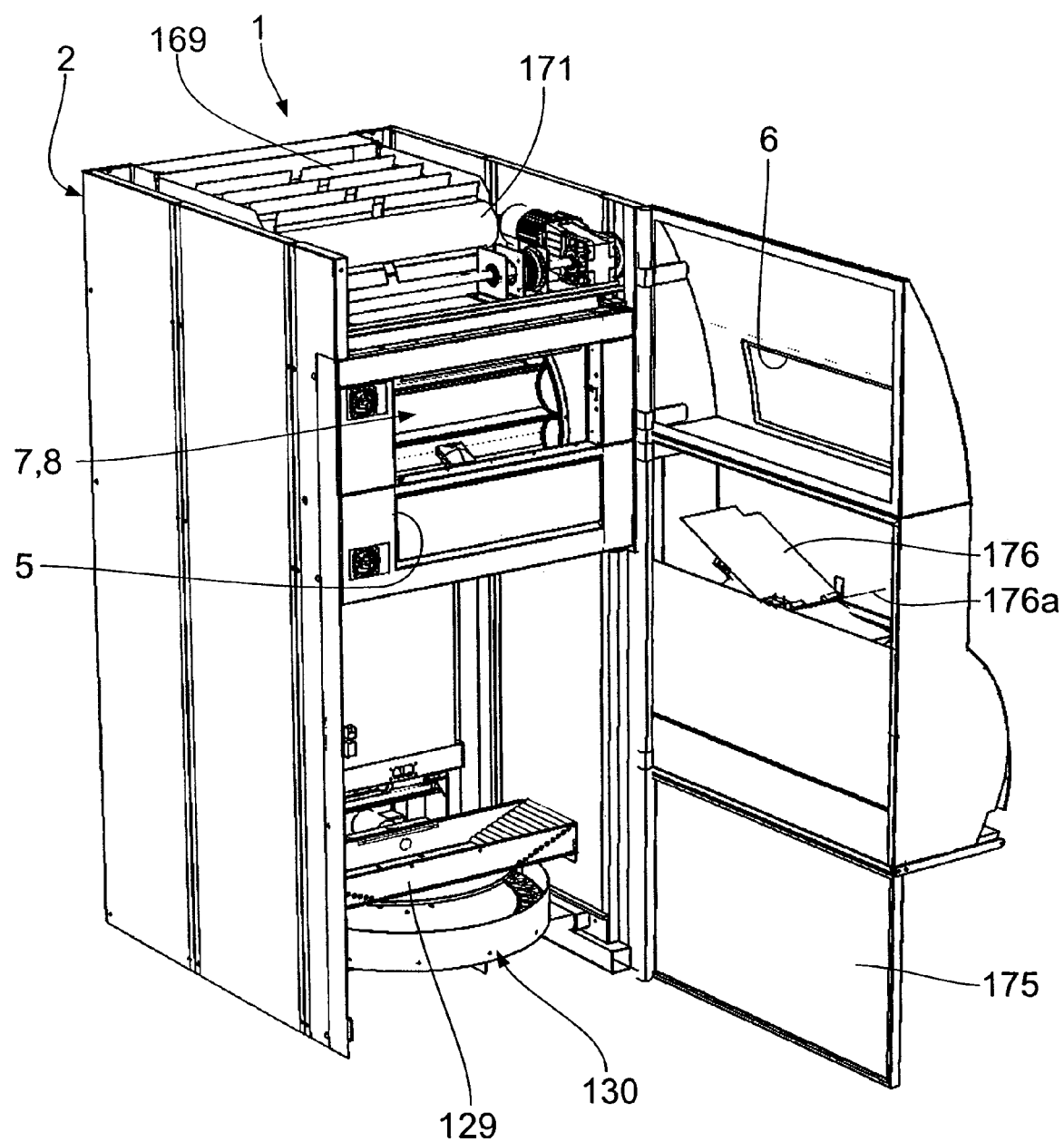
FIG. 15 is another perspective view of the baking system of FIG. 14 with an open front door that includes the discharge bin.

Triggered by the driving motor 108, the inner portion 105 is rotated for a short time, for example for 5 seconds, counter-clockwise in accordance with the plan view of FIG. 12. The baffle portion 111 of the baffle plate 110 transports the dough pieces from the inner portion 105 onto the outer portion 106, owing to the motion of the inner portion 105 relative to the baffle plate 110. Simultaneously, the outer portion 106, driven by the driving motor 109, rotates clockwise in FIG. 12 so that any dough pieces 4 on the outer portion 106 are conveyed towards the outlet portion 113, guided by the outer portion 106 of the short baffle portion 112 of the baffle plate 110. For jam of the dough pieces 4 in the delivery bin 100 in the vicinity of the baffle portion 111 to be avoided, the sense of rotation of the inner portion 105 is changed from time to time. From the outlet portion 113, the dough pieces 4 drop through the supply outlet 99 and, in doing so, is counted by the sensor 115. The sensor 115, which is connected with the central control unit of the baking system 1, passes feedback to the control unit on the extent to which the required demand of dough pieces 4 is met. When the required number of dough pieces 4 has dropped through the supply outlet 99, the central control unit stops the driving motors 108 and 109, also stopping any further actuation of the driving motors 97 so that no further outlet flap 85 will be opened. The dough pieces that drop through the supply outlet 99 moves via the chute 33 towards the lifting and delivering device 34 and is further processed as described in connection with FIGS. 1 to 6.

The supply arrangements 9, 75 specified may also be used in a baking system without lifting delivery.

FIGS. 14 to 27 illustrate another embodiment of a baking system with a charging arrangement and components thereof. Components that correspond to those described above in connection with FIGS. 1 to 13 have the same reference numerals and will not be explained in detail again.

Figure 16:
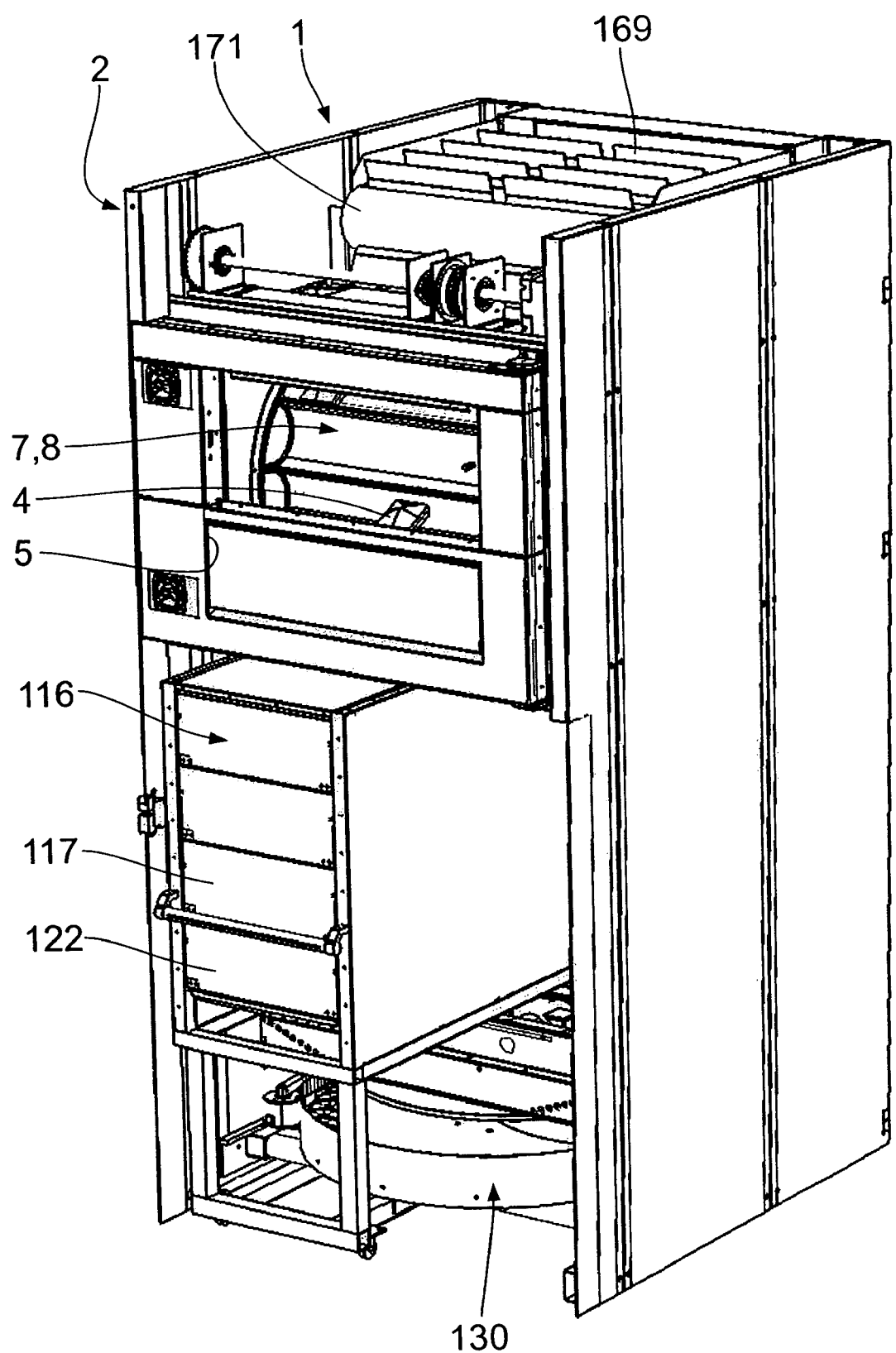
FIG. 16 is a view of the baking system similar to FIG. 14, with the front door and a movable bin support of a supply arrangement of the baking system being omitted.
Figure 20:
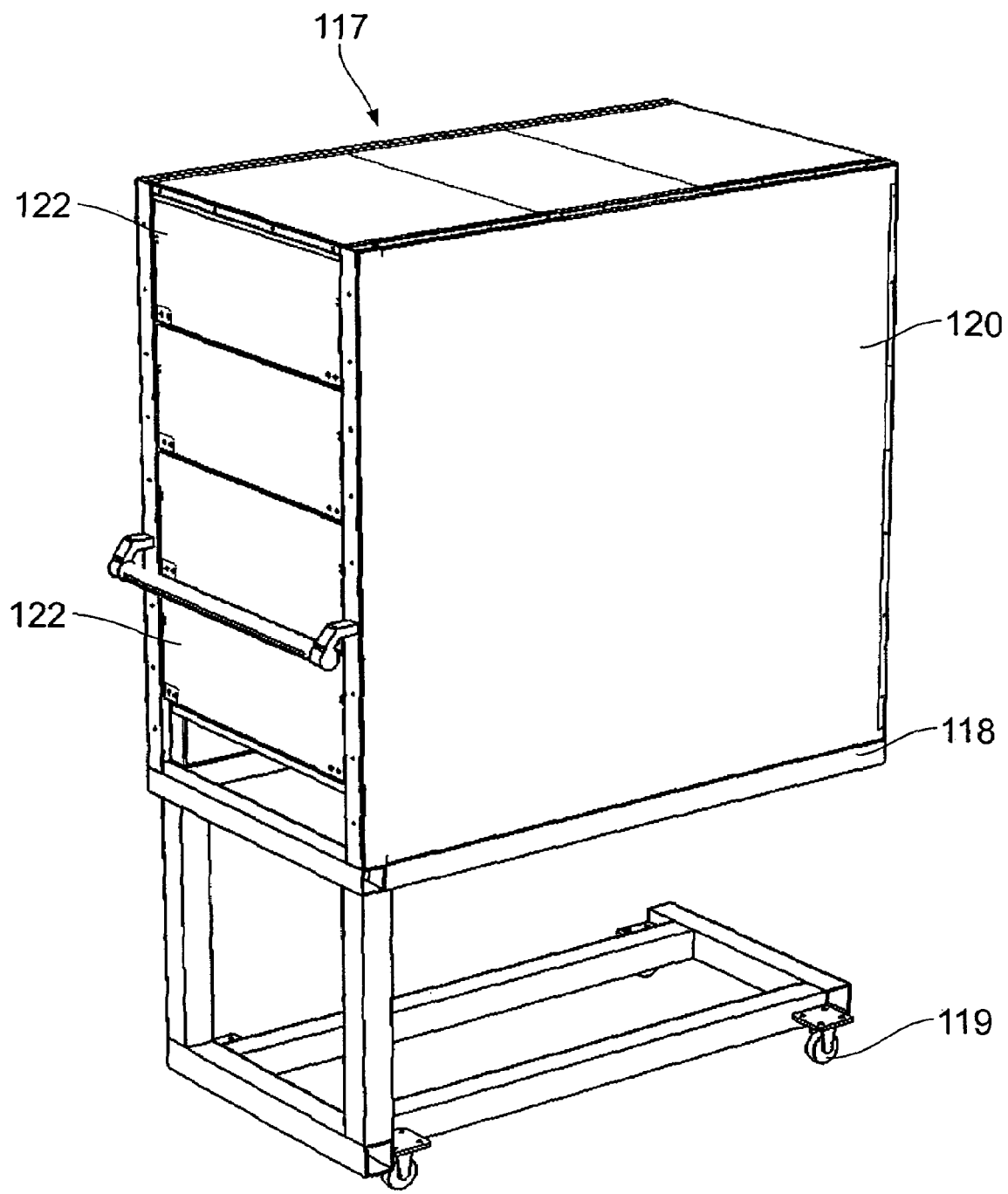
FIG. 20 is a perspective view of one of the two bin supports of the baking system of FIG. 14 with the charging inlets closed.

In the baking system 1 according to FIGS. 14 to 27, a supply arrangement 116 for dough pieces 4 comprises two side by side movable bin supports 117, only one of which is seen in FIG. 16. The second bin support 117 can be inserted into the receptacle on the right of the bin support 117 seen in FIG. 16. FIG. 20 shows one of the bin supports 117. It comprises a supporting frame 118 which is approximately C-shaped in a side view. The bottom leg of the supporting frame 118 is provided with four casters 119, rendering the bin support 117 movable. A bin casing 120 is placed on the top C leg of the supporting frame 118, having a plurality of shelves 121 which serve as supply bins for dough pieces 4. The division of the bin casing 120 into shelves 121 corresponds to the division of the supply arrangement 75 seen in FIG. 8. The inlet portions 77 of the shelves 121 can be closed by charging flaps 122.

Figure 21:
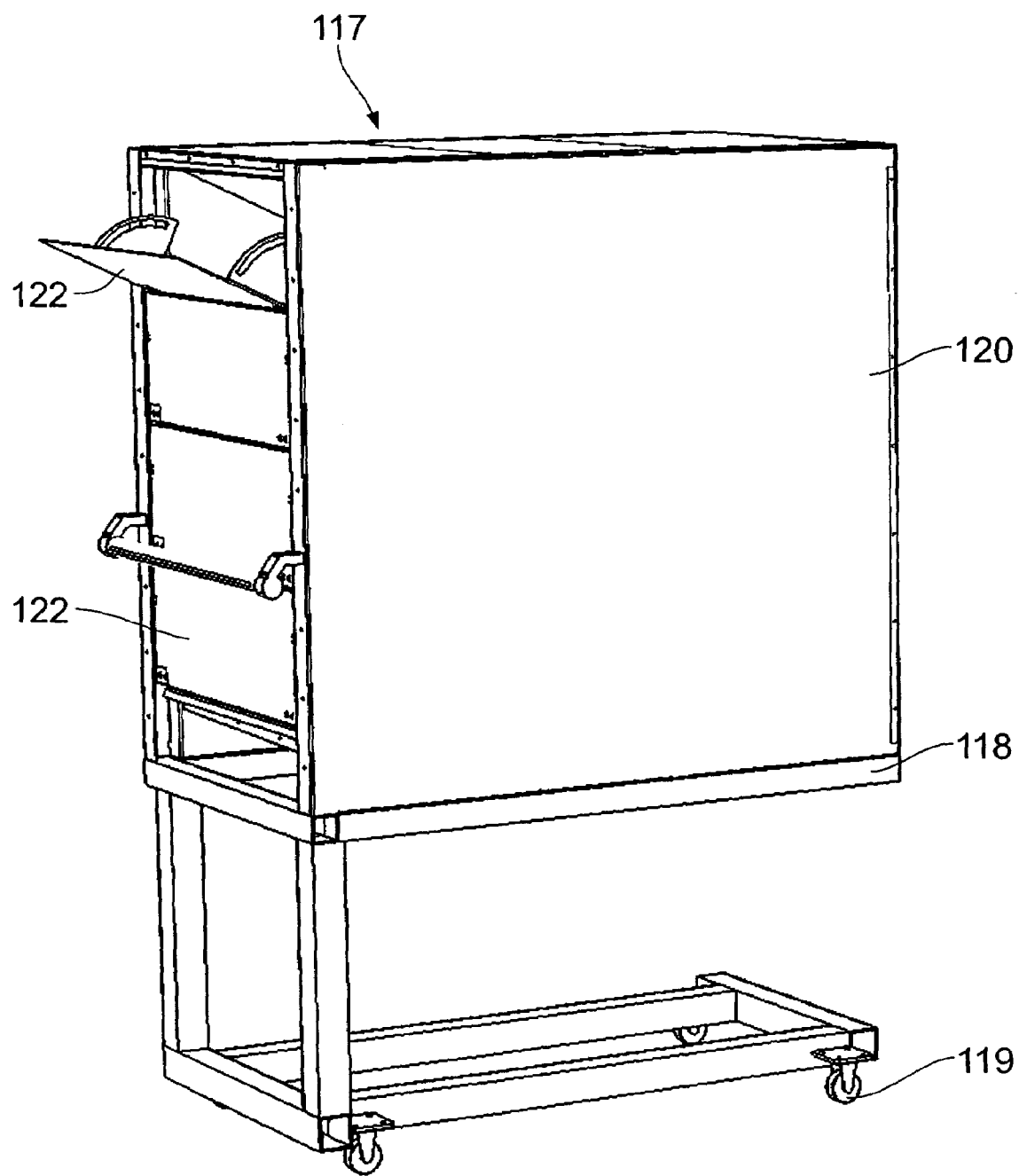
FIG. 21 is a view, similar to FIG. 19, with a charging flap of a charging inlet in an open position.
Figure 22:
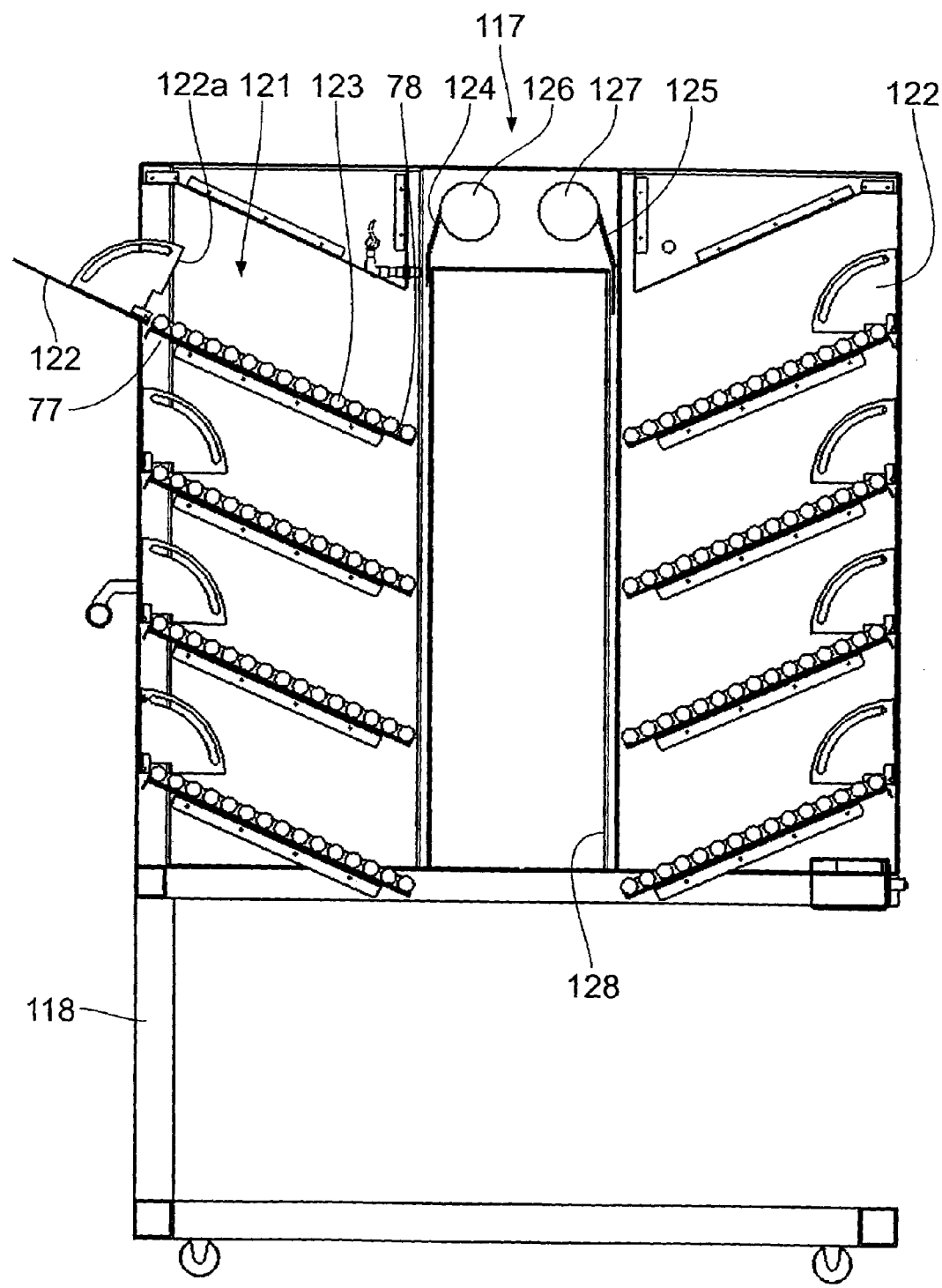
FIG. 22 is a vertical longitudinal sectional view of the bin support of FIG. 20.

FIGS. 21 and 22 show the charging flap 122 on the top left in an open position. Otherwise the charging flaps 122 are shown in a closed position. The charging flaps 122 have a bottom 122*a*, in the open position defining a charging chamber in the form of a quartered hollow cylinder. The bottom of the shelves 121 that incline downwards towards the outlet portion 78 is formed by roller paths 123. In the bin support 117 of the embodiment according to FIGS. 14 to 27, the shelves 121 are closed by two outlet sliding walls 124, 125 in the form of articulated link walls instead of outlet flaps. The four shelves 121 on the left in FIG. 22 are closed by the outlet sliding wall 124 and the four shelves 121 on the right in FIG. 22 by the outlet sliding wall 125. The outlet sliding walls 124, 125 can slide on driven rolls 126, 127 that are diagrammatically outlined in FIG. 22.

The outlet portions 78 of the shelves 121 discharge into a central well 128. With the bin supports 117 being positioned within the casing 2, an intermediate bin 129 of a supply and delivery arrangement 130 is arranged below the same. In conformity with the supply and delivery arrangement 98 of the embodiment according to FIG. 7 to FIG. 13, the latter also has the function of the conveyance of the dough pieces to a supply outlet of the supply arrangement 116.

The intermediate bin 129 which is open at the top is laterally defined by two opposite side walls 131, 132 which are mounted on a supporting frame 133. Furthermore, the intermediate bin 129 is laterally defined between the side walls 131, 132 by opposing roller paths 135 sloping towards an intermediate bin bottom 134. The intermediate bin bottom 134 is about semi-circular and pivotable around a vertical axis 136 which runs through the circle center of this semi-circle. Consequently, the pivot axis is off-center relative to the area of the intermediate bin bottom 134.

For the pivot drive, a driving pinion 137 of a driving motor 138 mounted on the supporting frame 133 engages a complementary counterpart in the intermediate bin bottom 134. The instantaneous position of the intermediate bin bottom 134, i.e. its instantaneous pivot position around the pivot axis 136 is recorded by sensors 139, 140. The angle sensor 139 records here the instantaneous pivot angle of the intermediate bin bottom 134 around the pivot axis 136. Sensor 140 in the form of a light barrier records whether the intermediate bin bottom 134 is in a closed position, for instance shown in FIG. 23, in which it completely closes the intermediate bin 129 or in an outlet position deviated around axis 136 relative to the closed position. In the closed position, the light barrier of sensor 140 is not interrupted by intermediate bin bottom 134 which is, however, the case in the outlet positions.

Figure 26:
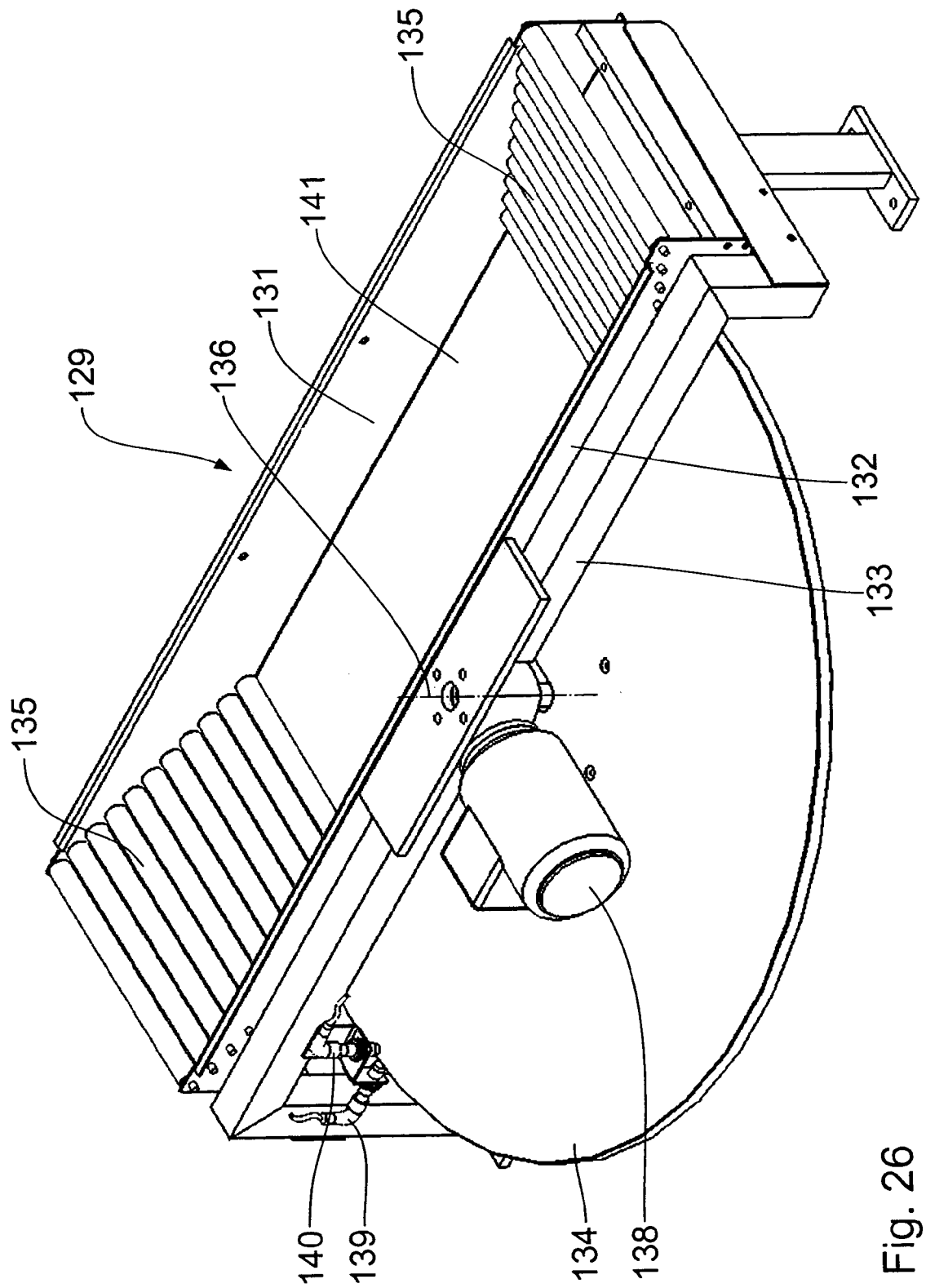
FIGS. 26 and 27 are perspective views of the intermediate bin of the supply and delivery arrangement of FIG. 23 in two differing positions of discharge of an intermediate bottom.
Figure 27:
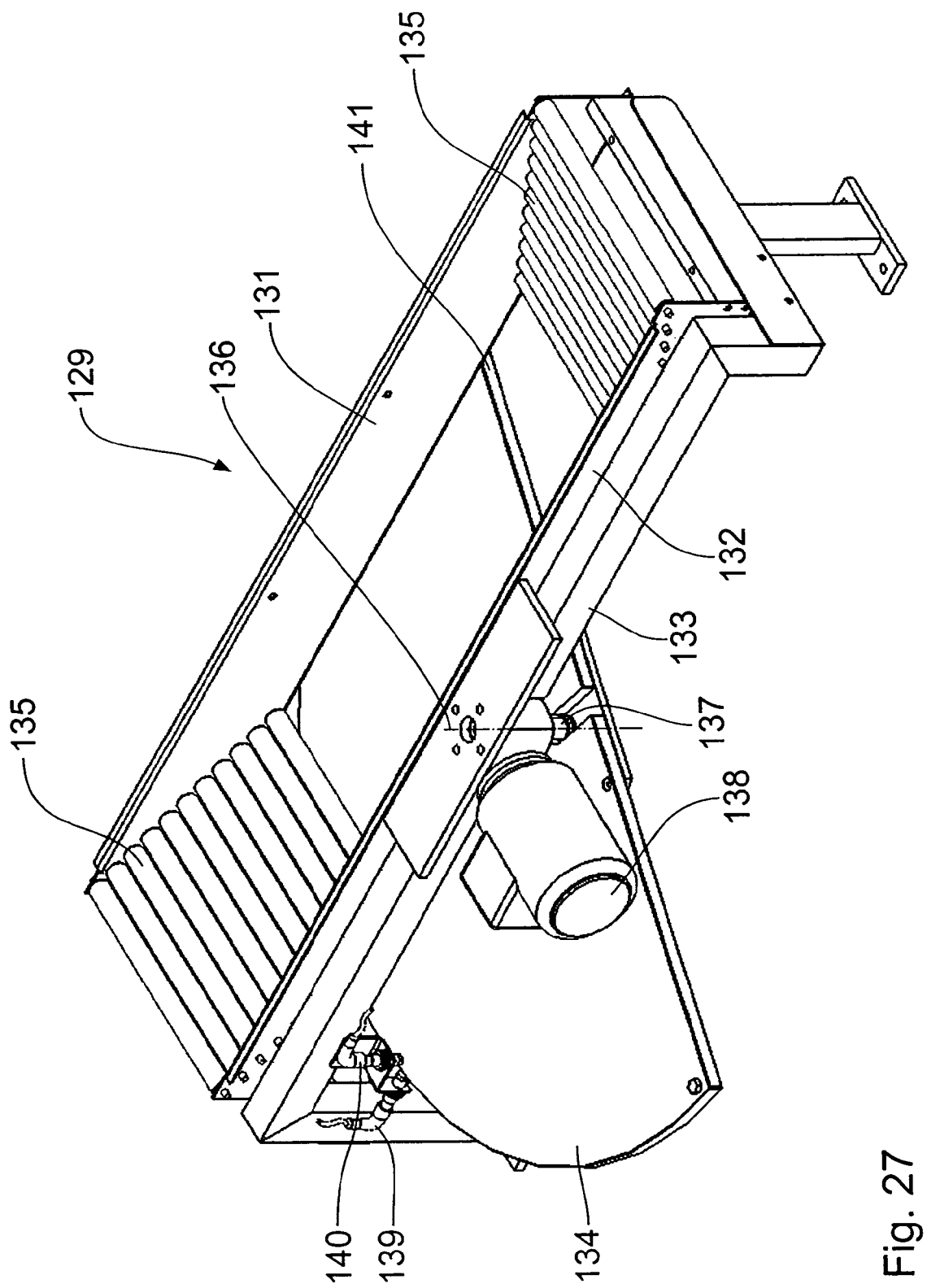

Two outlet positions of the intermediate bin bottom 134 are shown by way of example in FIG. 26 and FIG. 27. In the outlet position according to FIG. 26, the intermediate bin bottom 134 is completely pivoted by 180° out of the closed position so that intermediate bin 129 is open at the bottom. In the outlet position according to FIG. 27, the intermediate bin bottom 134 is pivoted out of the closed position by about 60° anti-clockwise around pivot axis 136 resulting in a supply outlet 141 the width of which is about one quarter of the completely opened supply outlet 141 according to FIG. 26.

Figure 23:
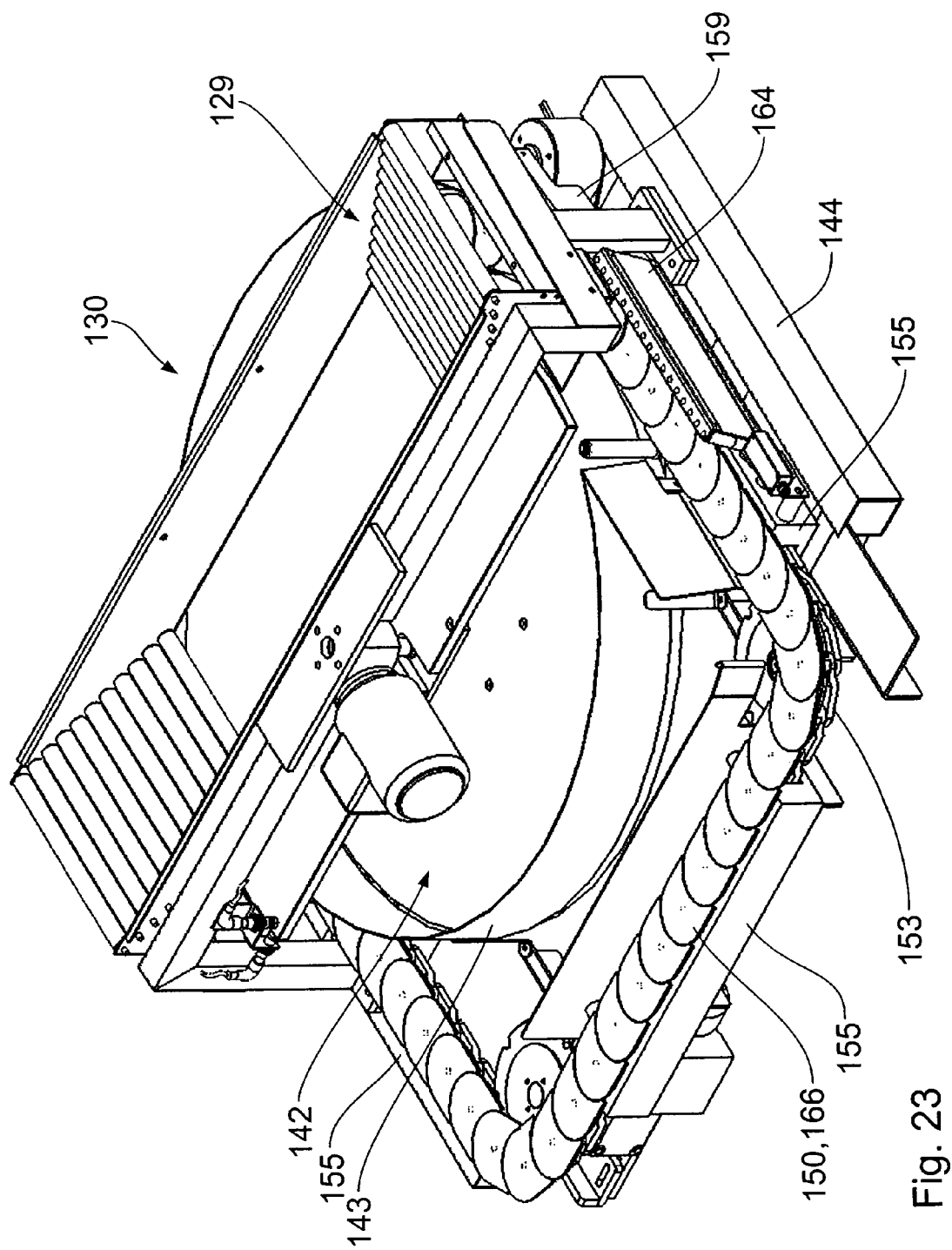
FIG. 23 is a perspective view of a supply and delivery arrangement of the baking system according to FIGS. 14 to 21, illustrating an alternative of the supply and delivery arrangement of FIG. 9.

Underneath the supply outlet 141 a separating unit 142 of the supply and delivery arrangement 130 is provided as is shown, for example, in FIG. 23. It comprises a delivery bin 143 with a function comparable to that of the delivery bin 100 of the embodiment according to FIG. 7 to FIG. 13. Intermediate bin 129 and the delivery bin 143 are supported by supporting sections 144*a* which in turn are mounted on the supporting frame 79 of the baking system 1.

Figure 24:
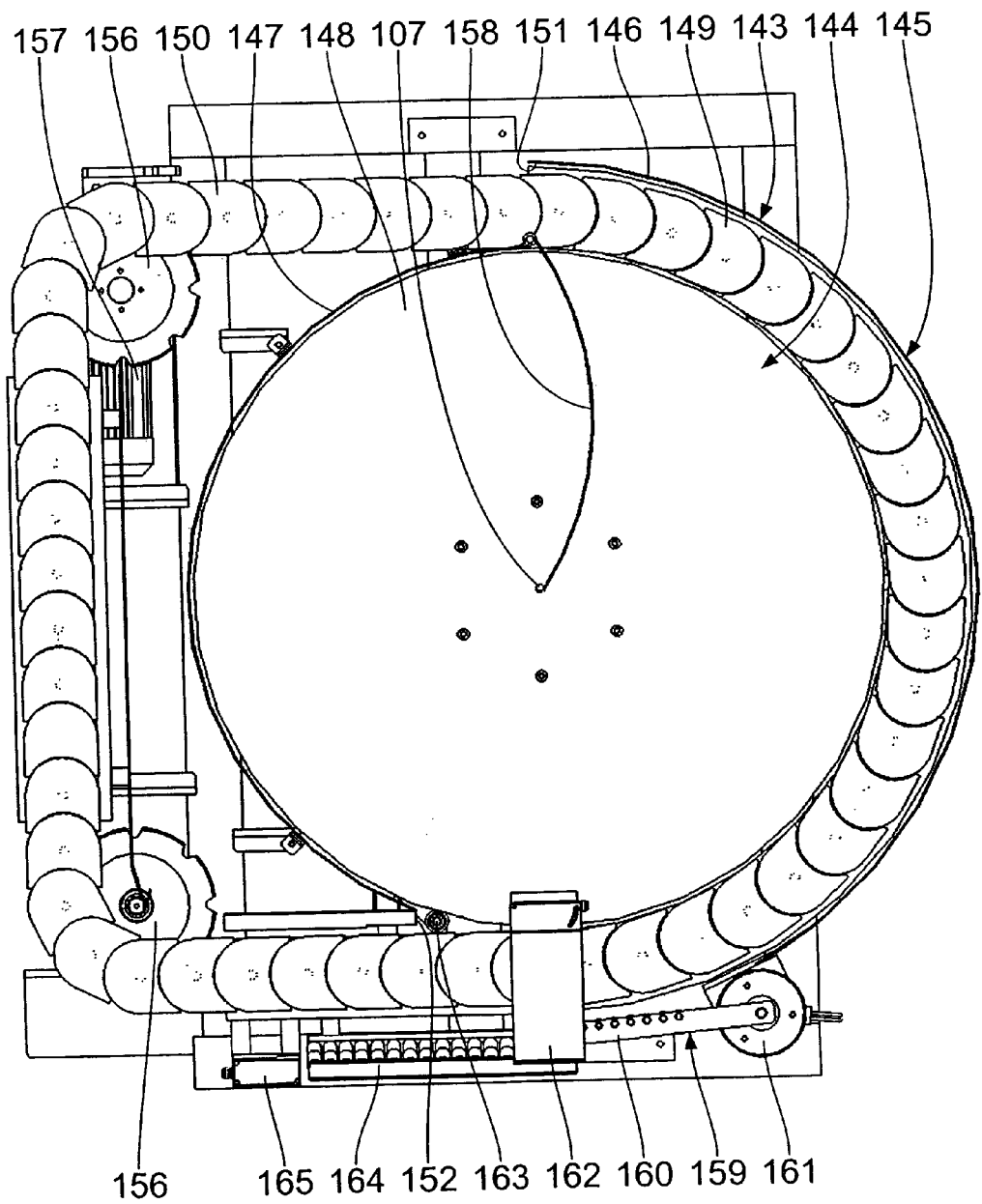
FIG. 24 is a plan view of the supply and delivery arrangement of FIG. 23, with an intermediate bin being omitted and a separating deflector being shown in a through position.
Figure 25:
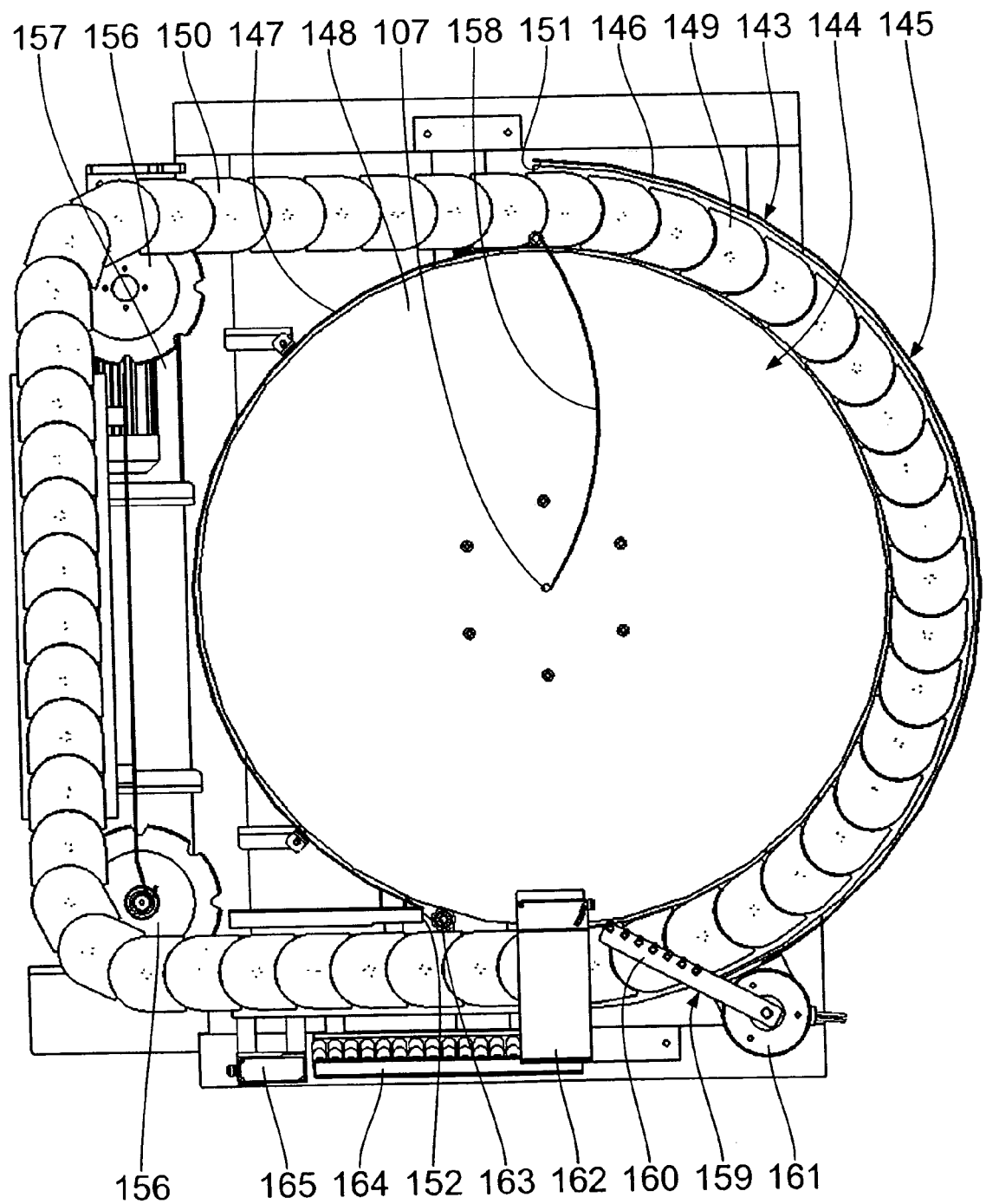
FIG. 25 is a view, similar to FIG. 24, of the supply and delivery arrangement with the separating deflector in a position of deflection.

Delivery bin 143 is provided with an essentially round bin bottom 144 and an essentially cylindrical bin wall 145 with a first bin wall portion 146 as shown on the right side of FIG. 24 and with a second bin wall portion 147, shown on the left side of FIG. 24, which in comparison to the first bin wall portion 146 has a smaller radius of curvature. Bin bottom 144 is provided with a round inner portion 148 of the type of the inner portion 105 of the embodiment according to FIG. 7 to FIG. 13 and a partially ring-shaped outer portion 149 externally surrounding part of the same. The latter is a conveyor belt 150 in the form of a slat conveyor which in the top view of FIG. 24 runs clockwise. Conveyor belt 150 enters the delivery bin 143 in FIG. 24 at the top through an inlet 151 defined between the bin wall portions 146, 147 and exits delivery bin 143 through an outlet 152 between the bin wall portions 146, 147 shown at the bottom of FIG. 24. The conveyor belt 150 is supported by a conveying chain 153. The latter is guided in the area of the outer portion 149 in a guiding section 154 in the form of a graduated circle (see FIG. 17). The portion of the conveyor belt 150 outside delivery bin 143, i.e. between outlet 152 and inlet 151 is guided by further guiding sections 155 and is deflected by two pinions 156 engaging conveying chain 153 with one of the pinions 156 being driven by a motor 157.

The inner portion 148 is rotatable via a driving motor 108 around the central, vertical axis of rotation 107 as is described in connection with the embodiment according to FIG. 7 to FIG. 13.

Rigidly connected to the first bin wall portion 146, a baffle plate 158 is rigidly connected in the area of inlet 151 to the second bin wall portion 147.

Relative to the delivery direction of conveyor belt 150 upstream of outlet 152, a separation deflector 159 is arranged adjoining conveyor belt 150 at its outside. The same is provided with a deflector flap 160 which can be switched by a driving unit 161 between a through position shown in FIG. 24 to a deflecting position shown in FIG. 25. In the latter position, the deflector flap 160 blocks the conveyor belt 150 in front of the outlet 152.

Relative to the delivery direction of conveyor belt 150 downstream, a separation sensor 162 formed as a light barrier is assigned to the separation deflector 159. Within the area of the outlet 152, the conveyor belt 150 is defined inwardly by a guide roller 163 and outwardly by a limiting wall portion 164 which runs parallel to the conveyor belt 150. Downstream of the limiting wall portion 164, another light barrier sensor 165 is arranged next to conveyor belt 150.

A straight portion of the conveyor belt between the two deflection pinions 156 represents an outlet hoistway 166 of conveyor belt 150, i.e. a delivery outlet portion of the same. Along this outlet hoistway 166, an outlet pusher 167 is switchably arranged and driven as a positioning unit (see FIG. 19). The switching movement of the outlet pusher 167 is guided via a guide rail 168 which is connected to the supporting frame of the backing system 1. In the instantaneous position shown in FIG. 19, one of a total of ten support troughs 169 is adjoining the outlet hoistway 166. As feed sections, support troughs 169 are part of a lifting and delivery device 170 which constitutes an alternative to the lifting and delivery device 34 of the embodiments pursuant to FIG. 1 to FIG. 13. The lifting and delivery device 170 comprises a continuous conveyor belt 171 which runs around horizontally arranged deflection rollers 172 one of which is driven.

Figure 17:
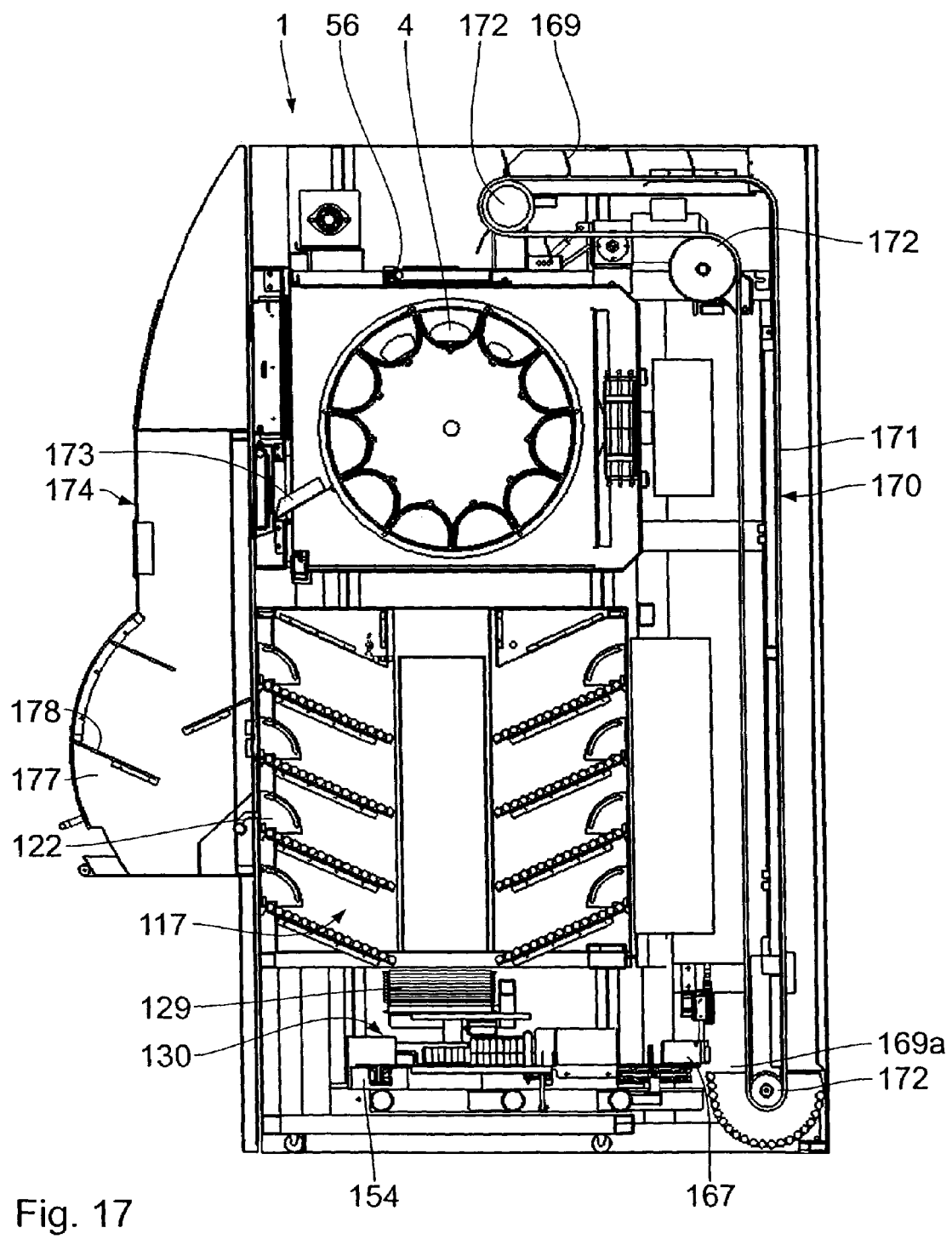
FIG. 17 is a vertical longitudinal view of the baking system according to FIG. 14.
Figure 18:
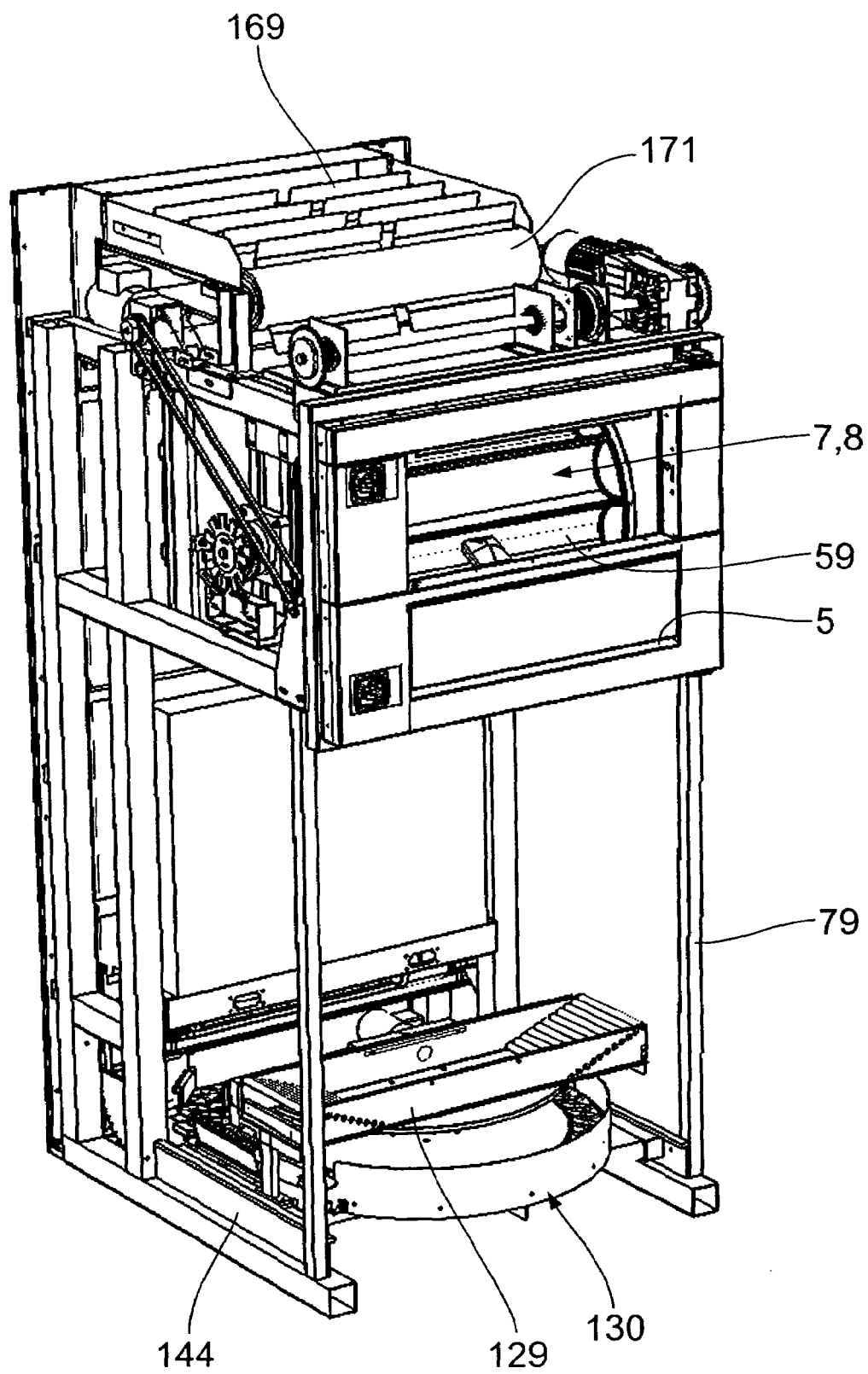
FIG. 18 is a view of the baking system similar to FIG. 16 without a bin support and with the side walls omitted.
Figure 19:
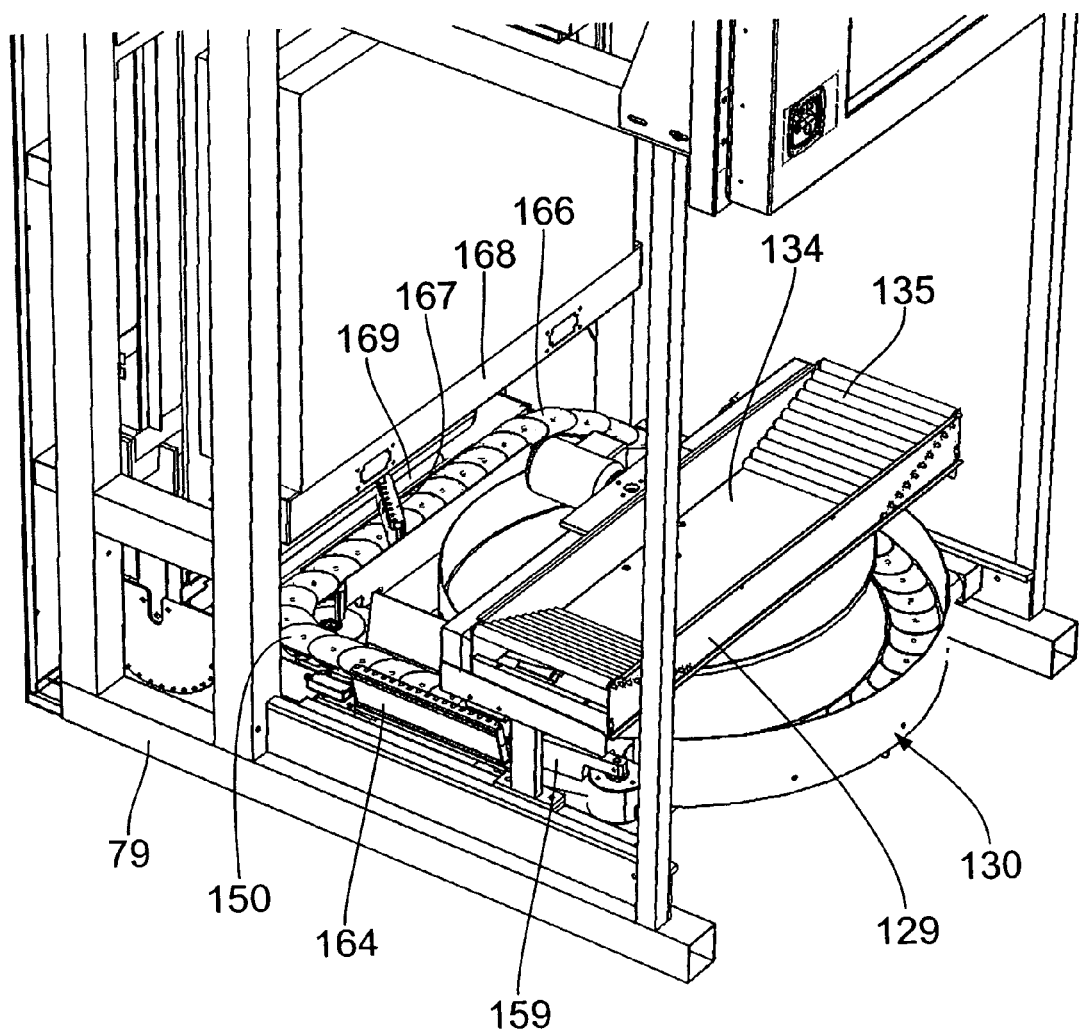
FIG. 19 is a sectional view of details of an illustration similar to FIG. 18 in the vicinity of a supply and delivery arrangement.
Figure 28:
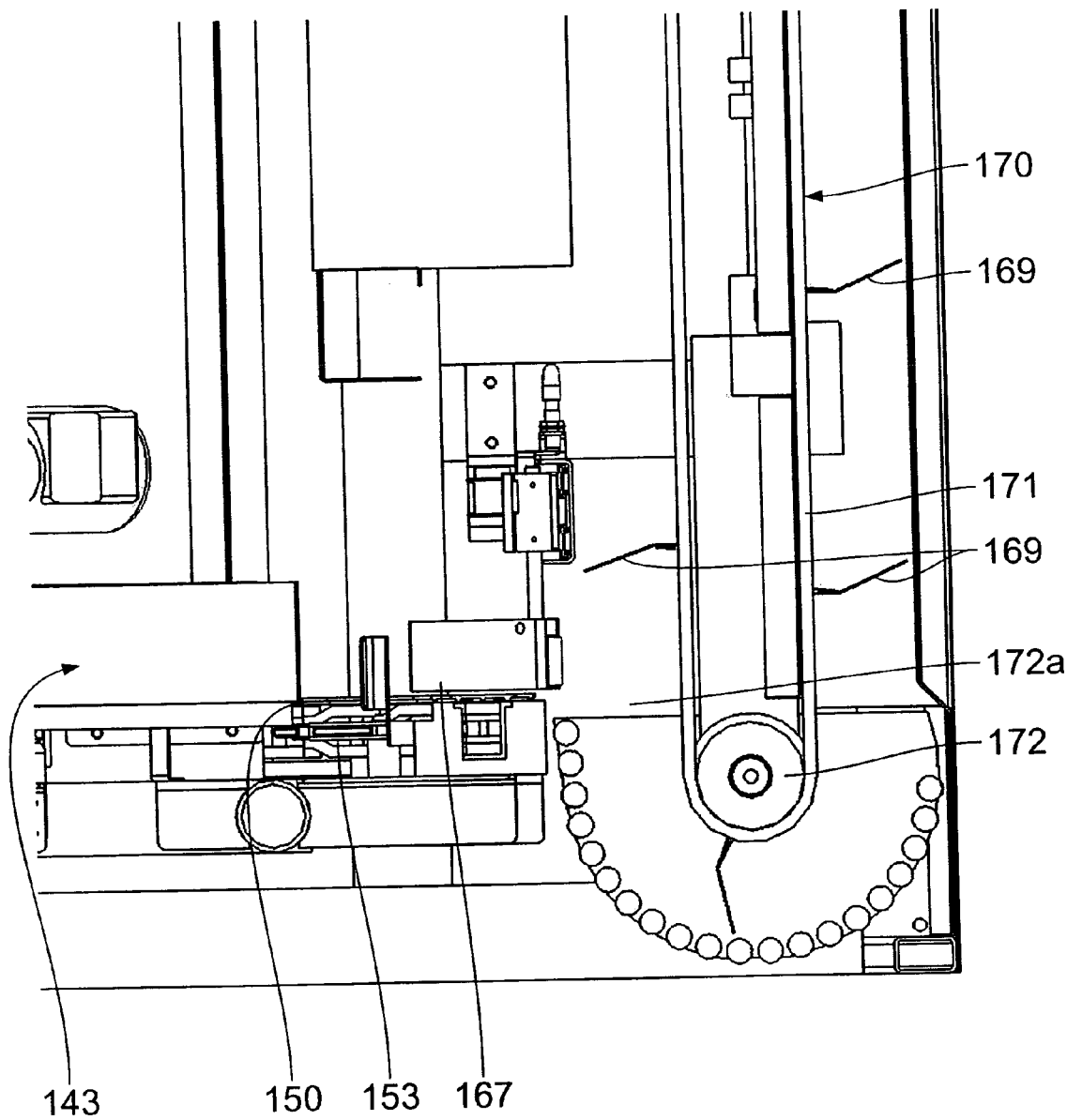
FIG. 28 is a view of details of FIG. 10 on an enlarged scale, with support troughs of a conveyor belt being illustrated in a bottom position of delivery.

FIG. 17 shows the lifting and delivery device 170 in an outlet position. The support troughs 169 reach here at the top turning point of the continuous conveyor belt 171 in a position in which they are arranged above the charging inlet 56 of the baking oven 8. A charging position of the support troughs 169 in which one of the support troughs 169 is adjoining the outlet hoistway 166 for receiving dough pieces 4 from the outlet hoistway is shown in FIG. 28.

On the left side of FIG. 17 underneath baking drum 7, an outlet chute 173 is arranged which slopes downward to outlet 5. Downstream of the same is an extraction bin 174 of the baking system 1 according to FIG. 14 to FIG. 27. The latter is housed in a front door 175 which is mounted on housing 2 pivotably around a vertical axis. The window 6, too, is part of front door 175. With the front door 175 closed, a switching element 176 is arranged next to outlet portion 5 (see FIG. 15). The latter is driven pivotably around a pivot axis 176a which runs horizontally and vertically to the level of front door 175. In the several switch positions of switching element 176 which can be set via the pivot position, a respective transport path from the baking oven 8 to one extraction shelf 177 of extraction bin 174 which is associated with one of these switch positions is pre-set. The extraction bin 174 is provided with a total of two extraction shelves 177 which are accessible via six outlet flaps. In the lower portion of extraction bin 174, several brake-guide elements 178 are arranged the function of which will still be described.

Figure 29:
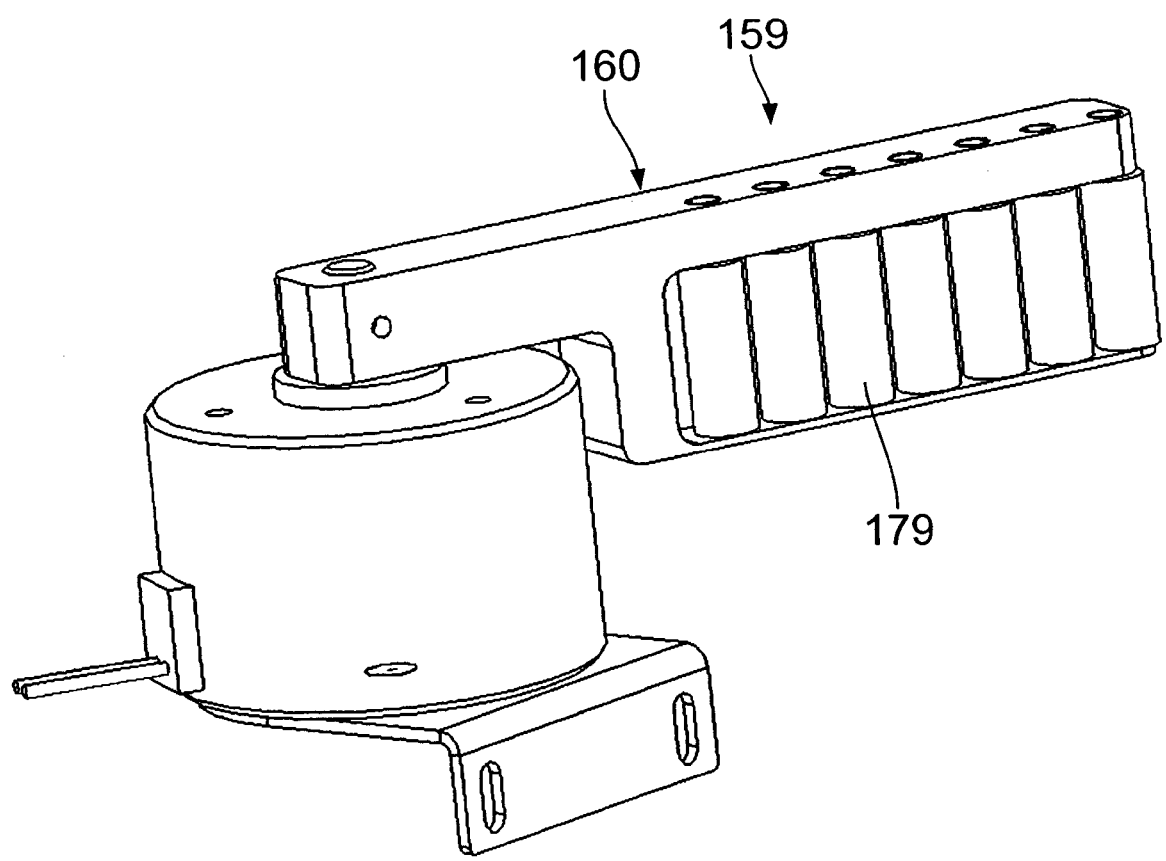
FIG. 29 is an enlarged view of a separating deflector of the supply and delivery arrangement of FIG. 23.

FIG. 29 shows separation deflector 159 in detail. Portions of the deflector flap 160 are formed as a roller train with a plurality of rollers 179 arranged next to each other and rotatable around a vertical axis of rotation.

Figure 30:
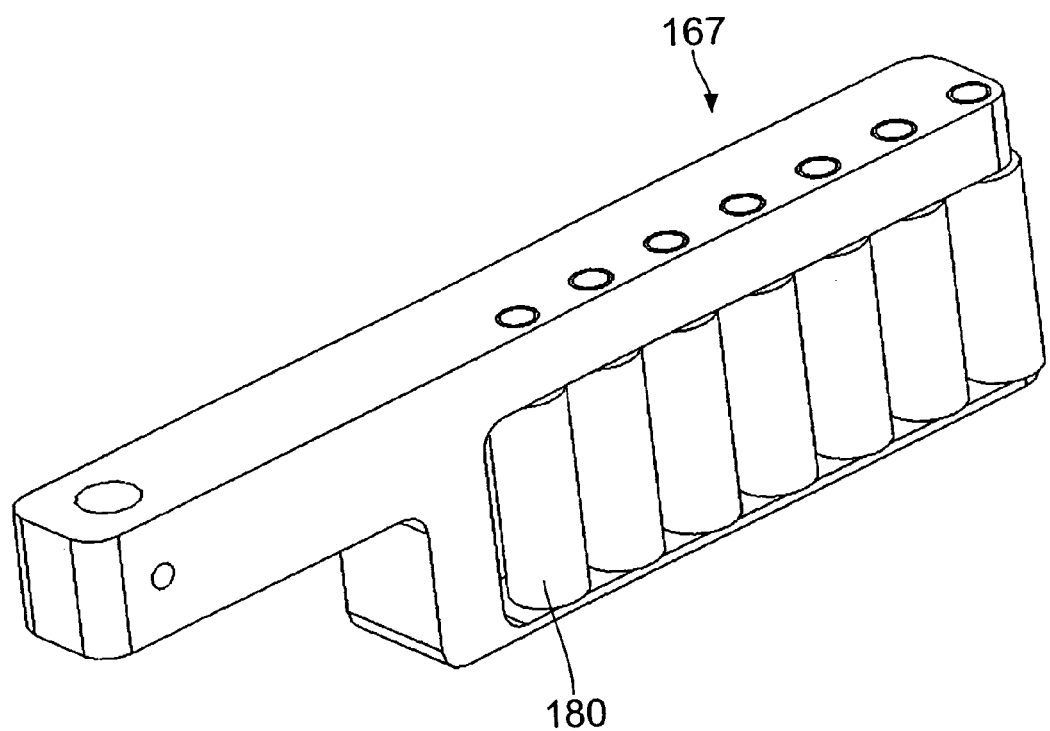
FIG. 30 is an enlarged view of a discharge slide of the supply and delivery arrangement of FIG. 23.

FIG. 30 shows the outlet pusher 167 in an enlarged representation. The pushing portion of it is—comparable to deflector flap 160—formed as a roller train with a plurality of rollers 180 which are arranged next to each other and are rotatable around a vertical axis of rotation.

When baking system 1 according to FIG. 14 to FIG. 27 is operated, the shelves 121 of the two bin supports 117 are filled first. When doing so, the bin supports 117 may well be arranged at a distance from the rest of the baking system 1. More than two bin supports 117 may also be provided the contents of which are alternately processed in the baking system 1. When the shelves 121 are filled, the outlet sliding walls 124 are completely in the down position so that the outlet portions of the shelves 121 are closed. During filling, the charging flap 122 is first switched to the open position which is shown in FIG. 22. Now, the charging space defined by the charging flap 122 is filled with pieces of dough. After filling, the two filled bin supports 117 are brought next to each other in a position relative to the housing 2 of the baking system 1 which corresponds to the position in FIG. 16. Owing to the C-shaped supporting frame and the dimensions of the respective receptacle in housing 2 for the bin support 117 the same is—when brought into the charging position which is shown in FIG. 16—aligned relative to the downstream delivery components, in particular to the intermediate bin 129. Thereafter, the outlet sliding walls 124, 125 are raised so that a lot of about 60 dough pieces 4 falls from the shelves 121 through the well 128 into the intermediate bin 129.

When the intermediate bin 129 is filled, the intermediate bin bottom 134 is in the closed position which is shown in FIG. 23. When the intermediate bin 129 has been filled, the intermediate bin bottom 134 is brought into a first outlet position according to FIG. 27. Part of the dough pieces inside the intermediate bin 129 falls then from the intermediate bin 129 into the delivery bin 143. The outlet position is chosen in such a way that not more than 25 dough pieces fall at once into the delivery bin 143. Thereafter the dough pieces are separated by means of the separating unit 142 of the supply and delivery arrangement 130. For this purpose, the inner portion 148 of the bin bottom 144 rotates anti-clockwise so that the dough pieces deflected by baffle plate 158 within the delivery bin 143 reach the area of inlet 141 of the conveyor belt 150. There, the dough pieces are transported by the conveyor belt 150 up to outlet 152. In order to facilitate the transfer of the dough pieces from the inner portion 148 to the conveyor belt 150 within the area of inlet 151, the level of the conveyor belt 150 in the area of inlet 151 can be somewhat lower than that of the inner portion 148. In turn, the level of conveyor belt 150 can be somewhat higher in the area of outlet 152 than that of the inner portion 148. In order to avoid a jam of the dough pieces within the area of inlet 151, the inner portion 148 rotates time and again briefly also clockwise. The inner portion 148 does, however, mainly rotate anti-clockwise.

As soon as the first dough piece on the conveyor belt 150 has passed the separation sensor 162, a respective signal sent out by the separation sensor 162 actuates the separation deflector 159. The deflector flap 160 then switches from the through position according to FIG. 24 to the deflector position according to FIG. 25 and deflects the dough pieces which follow the first dough piece from the conveyor belt 150 to the inner portion 148. When the dough piece is deflected, it rolls from the rollers 179 of the deflector flap 160. In this way, the dough piece is treated with care and a sticking of the dough pieces to the deflector flap 160 is prevented. When the level of conveyor belt 150 in the area of outlet 152 is somewhat higher than that of the inner portion 148, this deflection process is facilitated even more due to the influence of gravity. In this way, only the individual, first dough piece on the conveyor belt 150 passes outlet 152. The passage of the first dough piece 4 through outlet 152 is facilitated by guide roller 163 and the limiting wall portion 164. The guide roller 163 ensures that the dough pieces are in any case transported away from the area of outlet 152. The light barrier sensor 165 checks in the further course of conveyor belt 150 whether the separation was actually successful, i.e. whether the first dough piece has actually passed outlet 152. It is being checked here whether the light barrier sensor 165 reacts or does not react during a pre-set period of time after the switching of the separation deflector 159. When the separation was not successful, the separation deflector 159 is switched back to the through position, and the sequence which is described above which begins with the reaction of the separation sensor 162 starts again. When the separation was successful, the first dough piece is conveyed further on the conveyor belt 150 up to the outlet hoistway 166. For the first dough piece 4, the outlet pusher 167 is in the discharge position that is farthest downstream of conveyor belt 150. The first dough piece 4 is then transferred from the outlet pusher 167 under the influence of the retainer movement by the conveyor belt 150 and under the influence of gravity up to a portion of the support trough 169 adjacent to the outlet hoistway 166 which is next to the outlet pusher 167. During this discharge operation through the outlet pusher 167, the separated dough piece 4 rolls down from the rollers 180 of outlet pusher 167. This ensures a careful handling of the dough piece 4 and prevents its sticking to the outlet pusher 167. During the discharge operation, the support trough 169 is shown in a charging position near the lower reversal point of conveyor belt 171 as shown in FIG. 28. When the separated dough pieces 4 are transferred from the discharge hoistway 166 into the support trough 169, the dough pieces 4 pass a supply discharge outlet 172a. The latter is defined by the discharge hoistway 166, on the one hand, and by the continuous conveyor belt 171, on the other hand. While the first dough piece 4 is transferred into the support trough 169, the separation of the following dough piece 4 can already be carried out by means of the separation deflector 159 and the sensors 162 and 165, as described above. For the discharge of the second dough piece 4, the outlet pusher 167 moves a little bit along the discharge hoistway 166 upstream so that the next separated dough piece 4 is being discharged by means of the outlet pusher 167 up to a position of the support channel 167 which is adjacent to the position of the first separated dough piece upstream. This operation is now repeated while the outlet pusher 167 is continuously moved over a certain distance upstream of the discharge hoistway 166 until a set of dough pieces 4 is positioned on the support trough 169. A set may, for instance, consist of six or eight dough pieces 4.

As soon as such a set is complete, the continuous conveyor belt 171 of the lifting and delivery device 170 is moved a little bit further until the following support channel is positioned next to the discharge hoistway 166. Thereafter, a second set of dough pieces 4 is placed on the second support trough 169, as described in connection with the first, the leading support trough 169. This operation is repeated until all the ten support troughs 169 have been charged with a set of dough pieces 4. Thereafter, the sets of dough pieces which were positioned in this manner are conveyed upwards by means of the lifting and delivery device 170 along the rear wall of housing 2 until the first, the leading support trough 169 charged with dough pieces has reached a position in the area of the uppermost reversing shaft 172 of the lifting and delivery device 170. When the leading support trough 169 is transported further, the set of dough pieces 4 placed on the same falls through the opened charging inlet 56 and the bottom gate 57 into the uppermost receptacle 59 of baking oven 8. As soon as this receptacle 59 has been charged with the set of dough pieces 4, the internal limiting wall 60 of the baking drum 7 turns until the next receptacle 59 moves to the position of the receptacle that has just been filled. Thereafter, the continuous conveyor belt 171 is driven once again until the next set of dough pieces 4 is discharged from the next support trough 169 through the charging inlet 56 and the bottom gate 57 into the next receptacle 59. This operation as a whole is repeated another eight times until all ten sets of dough pieces 4 have been placed in ten of the eleven receptacles 59. Thereafter, the baking oven 8 is operated as described above in connection with the embodiments according to FIG. 1 to FIG. 13. Already during the baking process, the continuous conveyor belt 171 can be moved back until the first support trough 169 is located once again next to the delivery hoistway 166 so that already during the baking process a new separation sequence, as described above, can take place.

When the baking process is completed, the baking drum 7 is turned in such a way that the bottom gate 57 is placed directly above the outlet chute 173. Thereafter, the baking drum 7 is emptied, as described above in connection with the embodiment according to FIG. 1 to FIG. 13. The baked dough pieces 4 fall through outlet 5 into the extraction bin 174. By means of switch element 176, they are emptied into one or several pre-determined extraction shelves 177. The fall of the baked dough pieces 4 from outlet 5 into the extraction shelves 177 is delayed by several brake-guide elements 178 which are arranged in the extraction bin 174 in such a manner that damage to the dough pieces 4 is prevented. The baked dough pieces can now be taken out of the extraction shelves 177. If during the next baking charge another type of dough pieces is baked, the baked dough pieces 4 are conveyed via switch element 176 into different extraction shelves 177. Filling level sensors which are not shown and which are associated with the individual extraction shelves 177 ensure that a new automatic baking process as described above is started when a certain filling level in the extraction shelves 177 has not been reached.

The operations as described above for the baking system according to FIG. 14 to FIG. 30 are controlled by the central control unit according to the explanation given above in connection with the baking systems according to FIG. 1 to FIG. 13.

What is claimed is:

1. Baking oven (8) charging arrangement with at least one supply arrangement (9; 75; 116) for dough pieces (4) comprising;

a supply inlet for charging (3; 77), at least one supply bin (10; 23; 76; 121), a supply outlet (32a; 99; 169a) arranged below the supply inlet for charging (3; 77) in the area of the bottom of the supply arrangement (9; 75; 116), with a lifting and delivery device (34; 170) for dough pieces (4) comprising a delivery inlet portion (37) arranged below which is in delivery engagement with the supply outlet (32a; 172a) of the supply arrangement (9; 75; 116) in such a manner that the dough pieces (4) are conveyed from the supply outlet (32a; 99; 172a) to the delivery inlet portion (37) at least to some extent under the influence of gravity, a driven lifting and delivery device (170) between the delivery inlet portion (37) and a delivery outlet portion (43), wherein the supply arrangement (9; 75; 116) comprises a driven supply and delivery arrangement (28, 29; 98; 130) for the conveyance of the dough pieces (4) to the supply outlet (32a; 99; 172a) and for the separation of the dough pieces (4), and wherein the supply and delivery arrangement (98; 130) for the conveyance of the dough pieces (4) to the supply outlet (99; 169a) comprises:

a delivery bin (100; 143) with a bin bottom (103; 144) which is sub-divided into a round inner portion (105; 148) and into an in particular ring-shaped outer portion (106; 149) which at least partially surrounds the same, and wherein the outer portion (106; 149) is rotatably drivable relative to the inner portion (105; 148) around an axis of rotation (107) which is vertically standing at the bin bottom level and is in delivery engagement with the supply outlet (99; 169a).

2. Charging arrangement according to claim 1 wherein the inner portion (105; 148) is rotatably drivable around the axis of rotation (107) independent of the outer portion (106; 149).

3. Charging arrangement according to claim 1 wherein the delivery bin (100; 143) is provided with a rigid baffle plate (110; 158) which is shaped in such a way that due to a relative movement between the baffle plate (110; 158) and the inner portion (105; 148) pieces of dough (4) which initially are located on the inner portion (105; 148) are deflected to the outer portion (106; 149).

4. Charging arrangement according to claim 1 wherein the inner portion (105; 148) can be driven around the axis of rotation (107) with alternating direction of rotation.

5. Charging arrangement according to claim 1 wherein the supply and delivery arrangement (130) is provided with an outer portion (149) in the form of a slat conveyor belt (150).

6. Charging arrangement according to claim 1 having a separation deflector (159) which cooperates with at least one separation sensor (162) and which conveys, depending upon a signal of the separation sensor (162), the dough pieces (4) which follow a first dough piece (4) conveyed on the outer portion (149) from the outer portion (149) back to the inner portion (148).

7. Charging arrangement according to claim 6 wherein a further sensor (165) downstream of the separation deflector (159) in the conveyance direction of the outer portion (149) for recording dough pieces (4) which are conveyed on the outer portion (14) after the separation deflector (159).

8. Charging arrangement according to claim 6 wherein the supply and delivery arrangement (130) is provided with an outlet pusher (167) which is associated with an outlet hoistway (166) of the outer portion (149) after the separation deflector (159) and which conveys dough pieces (4) transversely to the delivery direction of the outlet hoistway (166) from the same to the delivery inlet portion (172a) of the lifting and delivery device (170).

9. Charging arrangement according to claim 8 wherein the outlet pusher (167) is the positioning device and is adjustable for providing the set of dough pieces (4) over the length of the outlet hoistway (166).

10. Baking oven (8) charging arrangement with at least one supply arrangement (9; 75; 116) for dough pieces (4) comprising a supply inlet for charging (3; 77), at least one supply bin (10; 23; 76; 121), a supply outlet (32a; 99; 169a) arranged below the supply inlet for charging (3; 77) in the area of the bottom of the supply arrangement (9; 75; 116), with a lifting and delivery device (34; 170) for dough pieces (4) comprising a delivery inlet portion (37) arranged below which is in delivery engagement with the supply outlet (32a; 172a) of the supply arrangement (9; 75; 116) in such a manner that the dough pieces (4) are conveyed from the supply outlet (32a; 99; 172a) to the delivery inlet portion (37) at least to some extent under the influence of gravity, a driven lifting and delivery device (170) between the delivery inlet portion (37) and a delivery outlet portion (43), wherein the supply arrangement (116) comprises at least one mobile bin support (117) having the at least one supply bin (121) having a dimensioning of a receptacle for the at least one mobile bin support (117) in such a manner that the bin support (117) when inserted in the charging position is aligned relative to the downstream delivery components of the charging arrangement.

11. Baking oven (8) charging arrangement with at least one supply arrangement (9; 75; 116) for dough pieces (4) comprising a supply inlet for charging (3; 77), at least one supply bin (10; 23; 76; 121), a supply outlet (32a; 99; 169a) arranged below the supply inlet for charging (3; 77) in the area of the bottom of the supply arrangement (9; 75; 116), with a lifting and delivery device (34; 170) for dough pieces (4) comprising a delivery inlet portion (37) arranged below which is in delivery engagement with the supply outlet (32a; 172a) of the supply arrangement (9; 75; 116) in such a manner that the dough pieces (4) are conveyed from the supply outlet (32a; 99; 172a) to the delivery inlet portion (37) at least to some extent under the influence of gravity, a driven lifting and delivery device (170) between the delivery inlet portion (37) and a delivery outlet portion (43), wherein the supply arrangement (75; 116) is provided with a plurality of individual controlled supply bins which can be emptied (76; 121) which are arranged floor-like on top of each other, wherein an outlet sliding wall (124, 125) which can be controllably shifted between an open position and a closed position is associated with at least one supply bin (121), wherein the outlet sliding wall (124, 125) is provided in the form of an articulated link wall that can be rolled up.

12. Baking oven (8) charging arrangement with at least one supply arrangement (9; 75; 116) for dough pieces (4) comprising a supply inlet for charging (3; 77), at least one supply bin (10; 23; 76; 121), a supply outlet (32a; 99; 169a) arranged below the supply inlet for charging (3; 77) in the area of the bottom of the supply arrangement (9; 75; 116), with a lifting and delivery device (34; 170) for dough pieces (4) comprising a delivery inlet portion (37) arranged below which is in delivery engagement with the supply outlet (32a; 172a) of the supply arrangement (9; 75; 116) in such a manner that the dough pieces (4) are conveyed from the supply outlet (32a; 99; 172a) to the delivery inlet portion (37) at least to some extent under the influence of gravity, a driven lifting and delivery device (170) between the delivery inlet portion (37) and a delivery outlet portion (43), wherein the supply arrangement (75; 116) is provided with a plurality of individually controlled supply bins which can be emptied (76; 121) which are arranged floor-like on top of each other, wherein an outlet sliding wall (124, 125) which can be controllably shifted between an open position and a closed position is associated with at least one supply bin (121), wherein the outlet sliding wall (124, 125) is associated with a plurality of supply bins (121).

13. Baking oven (8) charging arrangement with at least one supply arrangement (9; 75; 116) for dough pieces (4) comprising a supply inlet for charging (3; 77), at least one supply bin (10; 23; 76; 121), a supply outlet (32a; 99; 169a) arranged below the supply inlet for charging (3; 77) in the area of the bottom of the supply arrangement (9; 75; 116), with a lifting and delivery device (34; 170) for dough pieces (4) comprising;

a delivery inlet portion (37) arranged below which is in delivery engagement with the supply outlet (32a; 172a) of the supply arrangement (9; 75; 116) in such a manner that the dough pieces (4) are conveyed from the supply outlet (32a; 99; 172a) to the delivery inlet portion (37) at least to some extent under the influence of gravity, a driven lifting and delivery device (170) between the delivery inlet portion (37) and a delivery outlet portion (43), wherein the supply arrangement (9; 75; 116) comprises a driven supply and delivery arrangement (28, 29; 98; 130) for the conveyance of the dough pieces (4) to the supply outlet (32a; 99; 172a) and for the separation of the dough pieces (4), and wherein an intermediate bin (129) is provided in the conveyance path between at least one supply bin (121) and the supply and delivery arrangement (130) which is designed in such a manner that a partial quantity of dough pieces (4) is discharged from the intermediate bin (129) to the downstream components of the supply delivery arrangement (130).

14. Charging arrangement according to claim 13 wherein the intermediate bin (129) is provided with an outlet (141) the width of which can be adjusted.

15. Charging arrangement according to claim 14 wherein the intermediate bin (129) is provided with an intermediate bin bottom (134) which is adjustable around an off-center axis (136) between at least one open position and a closed position and which determines in the respective set position the width of the outlet (141).

16. Baking system with a charging arrangement with at least one supply arrangement (9; 75; 116) for dough pieces (4) comprising;

a supply inlet for charging (3; 77), at least one supply bin (10; 23; 76; 121), a supply outlet (32a; 99; 169a) arranged below the supply inlet for charging (3; 77) in the area of the bottom of the supply arrangement (9; 75; 116), with a lifting and delivery device (34; 170) for dough pieces (4) comprising a delivery inlet portion (37) arranged below which is in delivery engagement with the supply outlet (32a; 172a) of the supply arrangement (9; 75; 116) in such a manner that the dough pieces (4) are conveyed from the supply outlet (32a; 99; 172a) to the delivery inlet portion (37) at least to some extent under the influence of gravity, a driven lifting and delivery device (170) between the delivery inlet portion (37) and a delivery outlet portion (43)

and a baking oven, the baking system having an extraction bin (174) downstream of the baking oven (8) which is provided with a switch element (176) which can be switched to at least two switch positions and where the switch element (176) determines in each switch position a transport path for dough pieces (4) from the baking oven (8) to an extraction shelf (177) of the extraction bin (174) that is associated with the switch position.

* * * * *